(12) United States Patent
Dernebo

(10) Patent No.: US 9,882,515 B2
(45) Date of Patent: Jan. 30, 2018

(54) METHOD FOR MAKING A MOTOR QUIETER

(71) Applicant: LD Design Electronics AB, Odeshog (SE)

(72) Inventor: Lars Dernebo, Odeshog (SE)

(73) Assignee: LD DESIGN ELECTRONICS AB, Odeshog (SE)

( * ) Notice: Subject to any disclaimer, the term of this patent is extended or adjusted under 35 U.S.C. 154(b) by 0 days.

(21) Appl. No.: 15/626,205

(22) Filed: Jun. 19, 2017

(65) Prior Publication Data
US 2017/0288579 A1 Oct. 5, 2017

Related U.S. Application Data

(60) Division of application No. 15/096,532, filed on Apr. 12, 2016, now abandoned, which is a continuation-in-part of application No. 13/974,089, filed on Aug. 23, 2013, now Pat. No. 9,344,018.

(51) Int. Cl.
H02K 29/08 (2006.01)
H02P 6/15 (2016.01)
F04D 29/66 (2006.01)
F04D 27/00 (2006.01)
H02P 6/22 (2006.01)

(52) U.S. Cl.
CPC ............ H02P 6/153 (2016.02); F04D 27/004 (2013.01); F04D 29/663 (2013.01); H02P 6/22 (2013.01)

(58) Field of Classification Search
CPC ........ H02K 29/12; H02K 29/08; H02K 29/10; H02P 6/14; H02P 6/16; H02P 6/06
USPC .......... 318/400.29, 400.37, 400.38, 432, 434
See application file for complete search history.

(56) References Cited

U.S. PATENT DOCUMENTS

| | | | | |
|---|---|---|---|---|
| 4,266,177 A * | 5/1981 | Nola | ....................... | H02P 23/26 318/799 |
| 4,556,700 A * | 12/1985 | Harris | ................ | C08G 18/3215 526/208 |
| 6,611,117 B1 * | 8/2003 | Hardt | ........................ | H02P 6/12 318/400.1 |
| 6,845,020 B2 * | 1/2005 | Deng | ...................... | H02J 7/345 363/37 |
| 8,036,518 B2 * | 10/2011 | Chiu | ....................... | H02P 7/285 318/400.13 |
| 8,395,340 B2 * | 3/2013 | Marvelly | .................. | H02P 6/14 318/400.06 |
| 8,643,319 B2 * | 2/2014 | Celik | ........................ | H02P 6/14 318/400.04 |
| 8,773,052 B2 * | 7/2014 | Clothier | .................... | H02P 6/14 318/400.01 |

* cited by examiner

*Primary Examiner* — Rina Duda
(74) *Attorney, Agent, or Firm* — Fasth Law Offices; Rolf Fasth

(57) ABSTRACT

The method is for making an electric motor more efficient by iteratively changing when a processor sends activation signals to transistors to minimize a current required to rotate a rotor at a constant rotational speed. The method is also for changing a rotational direction of the rotor by switching the order in which activation signals are sent to the transistors.

6 Claims, 11 Drawing Sheets

METHOD FOR MAKING A MOTOR QUIETER

PRIOR APPLICATIONS

This is a divisional application of U.S. patent application Ser. No. 15/096,532, filed 12 Apr. 2016, that is a continuation-in-part application of U.S. patent application Ser. No. 13/974,089, filed 23 Aug. 2013.

TECHNICAL FIELD

The present invention pertains to a method for making a motor quieter such as a brushless direct current motor.

BACKGROUND AND SUMMARY OF INVENTION

Brushless fans are utilized in, for instance, computers, desktop fans, bathroom fans, and ventilation fans, and the like, because they are not as noisy as those operated by brushes. Nevertheless, brushless fan motors when operated, and when the stator energized electro-magnetic coils change polarization, an unwanted clicking or snapping noise can be heard particularly when the revolving fan blades do not override the clicking noise made by the fan motor. It is sometimes important that ventilation fans are as quiet as possible and the clicking noise should therefore be suppressed to avoid the noise problem.

A brushless fan motor can be driven by direct current (DC) by feeding DC to driver transistors through which the coils are energized. One object of the present invention is to provide a brushless DC motor, which reduces or suppresses the clicking/snapping noise produced when the motor switches its magnetic poles during operation. One important feature of the present invention is the concept of controlling the revolutions per minute (rpm) of the motor through pulse width modulated (PWM) signals when switching transistors and the controlling electronics are integrated inside the motor. The correct timing of the switching of the transistors may be accomplished by using a magnetic sensor, as described in detail below. For example, the on-time of the duty cycle of the pulsating PWM signal may be reduced to reduce the energy/voltage that in turn reduces the rpm of the motor. Thus, when a motor is not controlled through PWM signals, the motor obtains the rpm provided by the voltage when the magnetic circuit alters windings. When the rpm of the motor is only controlled by the variation of the voltage, the motor becomes weak when operating at a low rpm. The control of the rpm with the rpm feedback signal of the present invention makes the motor strong even at a low rpm. A first filter or pulse truncating device is used to truncate the up going flank of the pulsating PWM signals to softly or gradually open a first transistor. The smooth opening of the driving transistor reduces the noise from the stator coils during the switching on or turning-on process. The first filter ensures that the PWM pulses have a rise time as a result of the truncation, which allows the transistors to open smoothly and thus more quietly. To clarify, the first filter is not used to filter out the PWM pulses but is used to suppress undesirable noise by slowing down the rise time of the PWM pulses so that the transistors open more smoothly. It was surprisingly discovered that a very rapid opening of the transistors creates an undesirable clicking noise at the coils and that this clicking noise can be suppressed by truncating the PWM pulses to include a soft rise time which, in turn, permits the transistors to open more slowly to avoid the clicking noise from the coils. A transistor is similar to a water faucet in that if it is opened gradually or smoothly then this avoids the undesirable pressure peaks which cause the banging noise in the water pipe. In this way, the transistors of the present invention are gradually or slowly opened for each PWM pulse coming to the transistor gate by truncating the PWM pulses with a rise time which then allows the transistors to open up a bit slower. It should be understood that the words "gradually" and "slowly" are relative terms and merely mean that the transistors open more slowly compared to how the transistors would open if the PWM pulse had not been truncated. The opening of the transistors is still a fast process since they open in micro- or nanoseconds depending upon the frequency of the PWM signal. When the PWM frequency is about 16 kHz, the transistors may open between 1-5 microseconds, more preferably about 3 microseconds, softer or more gradual compared to the more sudden increase of the current when un-truncated signals are used. Rapid openings of the transistors, i.e. when the PWM pulses are not truncated, results in the sudden flow of current through the stator windings, which creates the undesirable clicking noise in the stator windings of the coils. By making the current-increase into the stator windings more gradual or slower, the current-increase is somewhat longer so there is enough time to start up the creation of magnetic fields in the stator without also creating the undesirable clicking sound. When the PWM pulses are truncated, the current-increase is still very fast, but slightly slower than if only the inductance limits the increasing of the current. The truncated signal may slow down the opening of the transistors with 150 nanoseconds to about 10 microseconds. The shorter time applies to high PWM frequencies. If only the coil inductance is used to limit the increase of the current, then the current rushes into the coils too fast and causes the undesirable clicking noise in the stator windings. In general, the coil inductance resists rapid changes of the current and the level of the resistance partly depends on the coil inductance. In the present invention, it is desirable to slow down the current increase through the coils more than what can be accomplished by merely relying on the slow-down caused by coil inductance.

A second filter or transient suppressor has a non-polarized capacitor that may be used to suppress noise caused by transients induced in the stator windings when the current is interrupted by a switch of transistors as a result of the PWM signal being sent into the second transistor instead of into the first transistor. A magnetic sensor may be used to sense when the direction of the magnetic field is switched (i.e. the polarity is switched from south pole to north pole or vice versa) at a fixed position relative to the stator so that it may be determined which transistor should be activated. In other words, the signal from the magnetic sensor may be mixed with the PWM signal so that the PWM signal is sent to the correct transistor at the right moment. One important feature of using non-polarized capacitor is that the noise from transients is suppressed and absorbed by electrolyte in the capacitor without creating any counter-acting force. Preferably, the turning-off of the first transistor should occur quickly so that the current-flow is quickly interrupted and so that the second transistor can draw current flow in the opposite direction. In a way, the electrolyte of the non-polarized capacitor absorbs the transient energy from the first winding when the current to the first transistor is abruptly turned off. When the second transistor starts conducting at the same moment the first transistor stops conducting, then the polarity of the non-polarized capacitor is switched and the capacitor charge changes polarity.

The acceptable level of the voltage transients may be set by using diodes and zener-diodes. It was surprisingly discovered that the second filter may thus be used to reduce the transient noise from the winding when the transistors are switched i.e. so that one transistor is switched on while another transistor is switched off. The use of the first and second filters to reduce the noise level from the motor during operation is particularly important when the rpm of the motor is relatively low so that the noise level from the motor is louder than the noise level from the rotating fan blades. The noise reducing features of the two filters may, of course, be used although the noise from the rotating fan blades exceeds that of the operating motor.

Preferably, the direct current motor of the present invention has a stator with at least four poles constituted by at least four teeth/arms. Each tooth has two electromagnetic coils making up a magnetic north and south-pole when energized with current-flow in the opposite direction each time. The motor should have one rotor constituted by at least two static magnetic north poles and two magnetic south poles. The motor of the present invention may have at least one of a central processor (CPU), or an electronic circuit unit that may be used to generate the PWM signal at a frequency range that is difficult to hear by a human ear. Preferably, the signal is adapted to be transmitted as a first input signal to a double gate function performing two AND gate functions so that each provides a PWM signal to each one of the two coil driving transistors in order to magnetize the coils in the four stator poles as north and south electromagnetic poles, respectively. Preferably, the stator thus has four poles that are wound so that every other winding is alternatingly wound in an opposite direction. The winding arrangement includes two parallel windings. This means that when current flows through one of the windings two south and two north poles are formed and when the current flows in the other winding all four poles change magnetic polarity so that north becomes south and south becomes north. The AND function gates are, preferably, adapted to receive a second signal activated by a sensor that measures a change in polarization of the rotors magnetic field in relation to the stator so that the AND function gates send the PWM signal to the driving transistors at the right time. The current through the coils may be determined by the duty cycle of the PWM signal and the power voltage to the windings and this determines the power of the created magnetic field in the stator poles. The PWM signal is, preferably, adapted to be received by at least two driving transistors so that each transistor may receive the PWM modulated signal from each of the AND gates. In this way, each driving transistor may receive an alternated modulated signal, based on the position of the magnetic field of the rotors to energize the coils into a north and south-pole at the right moment, respectively and based on the alternation of the magnetic field of the rotors. The driving transistors drive the coils every second time and alternate the current direction through the coils. Preferably, the first filter is connected to the gates of the driving transistors to ground. The time constant of the first filter may be determined by the frequency of the PWM signal. In this way, the first filter may be designed to open the transistors softly/smoothly. As indicated above, this ensures that the PWM pulses have a rise time which allows the transistors opens smoothly. The average current through the transistors decreases for each PWM pulse with increasing filter time. The second filter is, preferably, connected between the wire coils which have at least one capacitor that creates a non-polarized electrolyte which may be used to suppress the snapping sound from the motor when the transistors open up or close i.e. when the current in the stator coil is switched from one transistor to another transistor.

In one embodiment, the non-polarized capacitor is constituted by two serial connected electrolytic capacitors with altered polarity making up the second filter. Another embodiment provides that there is a ceramic capacitor connected in parallel included in the second filter.

Another embodiment provides that the zener diode is connected over each of the coil windings in series with a diode mounted in a reverse direction to suppress voltage transients in the zener direction so that the transients are limited to the level of the zener voltage plus the forward voltage drop of the diode. In yet another embodiment, the PWM signal is generated and sent from the central processing unit or a PWM circuit. Still yet another embodiment provides that the AND function gates are provided with the signal from the magnetic field sensor itself. The AND gate function can also be integrated inside the CPU.

Further one embodiment provides that a predetermined higher voltage output is utilized in a switch function to disconnect the first and the second filter as soon as the noise from the motors load overrides the noise from the motor itself. This higher voltage across the zener diode plus the diode can be used to power up a circuitry that can be used to disconnect the capacitors in the second filter with N-FET transistors when the noise level of the fan blades is so loud that the second filter is not needed since the noise from the fan blades is louder than any noise from the coils. This circuit may be controlled by a control signal from the CPU or the electronic circuit to control when it should connect or disconnect the capacitor based upon the rpm of the motor.

This higher voltage can provide a circuit with driving voltage so that N-FET transistors can work as an analog switch which may be used to disconnect the capacitors in the second filter when the noise level of the fan blades, as determined by the rpm of the motor, is so high that the filter does not need to suppress the clicking noise. In this way, a transistor can cut off the second filter through a signal from the microcontroller or the electronic circuit. It is important to distinguish these transistors from the other driving transistors that are in operative engagement with the windings.

A still further embodiment provides that an input signal is sent to the central processing unit or an electronic circuit through the sensor determining at which rpm the motor is operating. The sensor thus determines how fast the motor rotates but it does not necessarily determine at what rpm the motor should rotate. Preferably, this magnetic sensor provides information about when the polarity of the magnetic field in the rotor is changed and the sensor is positioned in a fixed place relative to the stator. This sensor may have a built-in complementary output that is connected to the inputs at each AND gates and they may be used to send the PWM signals to the coil driving transistors when the magnetic sensor senses a switch from a north to a south magnetic field or vice versa. For example, this means that if the sensor senses a switch to a south magnetic field, one AND gate opens up and sends the PWM signal to the first driving transistor. If the sensor senses a north magnetic field, the other AND gate opens up and sends the PWM signal to the second driving transistor. It is to be understood that there are different ways of generating the PWM signal. For example, if separate AND gates are used, the CPU or separate electronics generates the PWM signal that is sent to the AND gates where it is AND connected together with signals from the magnetic sensor. If the signals from the magnetic sensor are sent directly to the CPU and the AND function is integrated into the software of the CPU, the CPU may generate the PWM signals and send them directly to the correct transistor. Preferably, the AND gate is set up so that when the AND gate has two input gates and both receive signals, the signal received in the first input gate is passed through the output gate of the AND gate. In other words, if the AND gate only receives a PWM signal on the input gate then nothing is passed through to the output gate. However, when the input gate receives the PWM signal and the second input gate receives the signal from the magnetic sensor, then the AND gate opens the output gate so that the PWM signal may pass through the output gate of the AND gate i.e. as long as the magnetic sensor senses the magnetic field and generates the signal to the second input gate of the AND gate. It is also possible to use the pulses from the magnetic sensor to determine the rpm of the motor and when the rpm is known it is possible to adjust the PWM signal to a desirable rpm by changing the duty cycle of the PWM pulse to increase or reduce the rpm of the motor. This embodiment provides that the motor may be controlled through revolution feedback control with this sensor as an RPM input signal.

In summary, the method of the present invention is for making the brushless direct current (DC) motor quieter. The predetermined high frequency pulse width modulated (PWM) signal is generated. The PWM signal is sent to a first filter. The first filter truncates the PWM signal to provide the PWM signal with a longer rise time. The rise time allows transistors connected thereto to open smoothly. A second filter is provided that has a non-polarized capacitor. In a coil switching process, the non-polarized capacitor operates as a voltage or current absorption circuit between driving transistors. The coil switching process creates transient energy of voltage transients. The non-polarized capacitor absorbs the transient energy.

More particularly, the PWM signal is generated through at least one of a central processing unit, or an electronic circuit. The PWM signal is transmitted as a first input signal to an AND gate function. The AND gate function performs an AND gate function with the PWM signal and the signal from the magnetic field sensor. Each AND function gate provides an output signal to each one of the coil driving transistors to magnetize coils as north and south electromagnetic poles, respectively. A second input signal is sent to the AND gates, and that signal is activated by the magnetic field sensor when a change in the polarization of a magnetic field of rotors is measured the AND gate opens and puts out the PWM signal. It should be understood that the use of four poles for the motor is merely an illustrative example and that it is possible to use more or fewer poles if necessary.

The opening of the output gate of the AND gate occurs when the AND gate receives an input signal from the magnetic field sensor and the PWM signal as an input signal at the other input gate of the AND gate. Preferably, at least two driving transistors receive the PWM signal. Each driving transistor receives the PWM signal from one of the AND function gates. Each transistor receives a PWM signal, based on the polarity of the magnetic field of the rotors at the sensor position to energize the stator coils into a north and south magnetic pole, respectively, based on alternation of the magnetic field of the rotors. The driving transistors drive the stator coils every second time alternating a current direction and current strength through the stator coils. The first filter is, preferably, connected between the outputs of the AND gates and the gates of the driving transistors. A time constant of the first filter may be determined by a frequency of the PWM signal. The first filter is adapted to open the driving transistors to ensure that pulses of the PWM signal have a rise time which allows the driving transistors to opens smoothly. The average current through the driving transistors decreases with increasing filter time of the first filter. The second filter is, preferably, connected between the coils. The second filter has a capacitor that suppresses a snapping sound from the motor when the driving transistors open up and stop conducting current.

Preferably, the capacitor is a non-polarized electrolytic capacitor. The capacitor may be provided as two serial connected electrolytic capacitors with the same polarity connected to each other. For example, the plus poles of the capacitors are connected together or the minus poles of the capacitors are connected together to create a non-polarized capacitor. The other sides of the serial-connected capacitors are connected to the coils. This connection may be illustrated as −++− or +−−+.

The capacitor may be connected in parallel with a ceramic capacitor. Also, the zener diode may be connected over each of the coil windings in series with a diode mounted in reverse direction to suppress voltage transients in the zener direction and limiting the transients to a level of a voltage of the zener diode plus a forward voltage drop of the diode. A bi-directional TVS diode (Transient Voltage Suppressor) may also be used.

The method of the present invention for making a motor quieter includes the step of generating a predetermined high frequency pulse width modulated (PWM) signal. The PWM signal is sent to a first filter. The first filter truncates the PWM signal to provide the PWM signal with a rise time. The rise time allows driving transistors connected to the first filter to open smoothly. The second filter has a non-polarized capacitor. In a coil switching process, the non-polarized capacitor operates as a voltage and/or current absorption circuit between the driving transistors. The coil switching process creates transient energy of voltage transients. The non-polarized capacitor absorbs the transient energy. A CPU creates and sends the PWM signal, A magnetic sensor is provided that is moved to permit the CPU to delay sending the PWM signal. The CPU is provided with software to permit the CPU to delay sending the PWM signal. The current and voltage of the motor is measured to determine a motor load. A motor effect of the motor is determined based on the current and voltage of the motor. An efficiency of the motor is improved by moving a switching point for activating the stator windings. The PWM signal is used to control revolutions per minute (rpm) of the motor. The magnetic sensor sends a signal to a first input of an AND gate and a CPU sending the PWM signal to a second input of the AND gate. The non-polarized capacitor suppresses noise from the voltage transients. Zener diodes are used to limit the voltage transients. The CPU disconnects the non-polarized capacitor when revolutions per minute (rpm) of the motor are above a threshold value. In other words, when the sound of the fan is louder than the electrical sound from the motor, both the first and the second filters may be turned off to improve the efficiency of the motor.

The method is directed to making a direct current motor quieter by generating a predetermined high frequency pulse width modulated (PWM) signal through at least one of a central processing unit, or an electronic circuit, transmitting the PWM signal as a first input signal to a double gate function. The double gate function performs two AND gate functions at AND function gates. Each AND function gate provides a signal to each one of coil driving transistors to magnetize coils as north and south electromagnetic poles, respectively. A second signal, that is activated by a magnetic field sensor, is sent to the AND function gates. A change in polarization of a magnetic field of rotors is measured. A magnetic field sensor opens the AND function gates and outputs the PWM signal. At least two driving transistors receive the PWM signal. Each driving transistor receives the PWM signal from one of the AND function. Each transistor receives an alternated modulated signal, based on the magnetic field of the rotors to energize the coils into a north and south magnetic pole, respectively, based on alternation of the magnetic field of the rotors. The driving transistors drive the coils every second time alternating a current direction and current strength through the coils. A first filter is connected to the AND function gates of the driving transistors. A time constant of the first filter is determined by a frequency of the PWM signal. The first filter is adapted to open the driving transistors and ensures that pulses of the PWM have a rise time which allows the driving transistors to opens smoothly. The average current through the driving transistors decreases with increasing filter time of the first filter. The first filter may be used to control the current but most of the control and adjustments of the current is preferably done via the PWM signal and its duty cycle. A second filter is connected between the coils. The second filter has a capacitor. The capacitor suppresses a snapping sound from the motor when the driving transistors open up and close while drawing current through the coils to ground. The capacitor is provided as a non-polarized electrolytic capacitor. The capacitor is connected in parallel with a ceramic capacitor. A zener diode is connected over each of the coil windings in series with a diode mounted in reverse direction to suppress voltage transients in the zener direction and limits the transients to a level of a voltage of the zener diode plus a forward voltage drop of the diode. The central processing unit sends the second signal to the AND function gates. The magnetic sensor sends a signal to the CPU about a position of the rotor. The CPU creates the PWM signal and sends the PWM signal. The motor is controlled through a revolution feedback control.

The method for making a motor quieter includes the step of sending a pulse width modulated (PWM) signal to a first transistor. The first transistor conducts current into a stator winding. A second transistor is switched to by sending the PWM signal to the second transistor instead to the first transistor. The first transistor terminates conduction of the current into the stator winding and induces transients in the stator winding. A capacitor suppresses the transients induced by the first transistor. A non-polarized electrolyte capacitor is used to suppress noise from transients and a diode to set a voltage limit of the capacitor. A zener diode sets a voltage limit of the non-polarized electrolyte capacitor.

The method for making a motor quieter includes the step of a first transistor conducting current in a first direction through a stator winding and a capacitor. The first transistor is de-activated and a second transistor is activated. The second transistor conducts current in a second direction through the stator winding and the capacitor. The capacitor absorbs transient energy from the current created in a time period between deactivation of the first transistor and activation of the second transistor. A first end of the capacitor is filled with transient energy in the first direction while emptying previously stored transient energy out through a second end of the capacitor. The previously stored transient energy is emptied in the first direction.

The method is for making an electric motor more efficient. An electric motor is provided that has a rotor being rotatable in a first direction relative to a stator, a first and a second transistor electrically connected to the stator and to a processor. The rotor has magnets of first and second polarities separated at polarity changing points. A sensor senses a first polarity changing point. The sensor sends a first triggering signal to the processor. Upon receipt of the first triggering signal, the processor delays by a time period (t1) before sending a first activation signal to the first transistor to start rotating the rotor in the first direction. The first activation signal lasts for a time period (l1). The processor measures a current A1 driving the electric motor at a rotational speed. The sensor senses a second polarity changing point and sends a second triggering signal to the processor. Upon receipt of the second triggering signal, the processor delays by a time period (t1') before sending a second activation signal to the second transistor to continue rotating the rotor in the first direction. The second activation signal lasts for a time period (l2). The processor measures a current A2 driving the electric motor at the rotational speed. The processor compares the current A1 to the current A2 and selects time period (t1) for sending activation signals when the current A2 is greater than the current A1 and selects time period (t1') for sending activation signals when the current A1 is greater than the current A2. The processor iteratively changes the time period (t1) for each activation signal sent until a minimum current $A_{min}$ is found by comparing measured currents to optimize an efficiency of the electric motor.

In another embodiment, a first PWM pulse is used as the first activation signal.

A length of the first PWM pulse to the first transistor is varied.

The current A1 and the current A2 are measured at a constant rotational speed ($\omega$) of the rotor.

The processor continuously monitors currents driving the electric motor.

The first and second transistors are alternatingly used to drive the rotor in the first rotational direction.

The method is also for changing a rotational direction of a rotor of an electric motor. An electric motor is provided that has a rotor rotatable in a first direction and in a second opposite direction relative to a stator. A first and a second transistor are electrically connected to the stator and to a processor. The rotor has magnets of first and second polarities separated at polarity changing points. A first magnetic sensor is located ($\alpha$1) degrees prior to an activation point when the rotor rotates in the first rotational direction and a second magnetic sensor is located ($\alpha$2) degrees prior to an activation point when the rotor rotates in the second opposite rotational direction. The first magnetic sensor senses a first change of polarity at a first polarity changing point on the rotor and sends a first triggering signal to the processor. After receipt of the first triggering signal, the processor sends a first activation signal to the first transistor to keep on rotating the rotor in the first rotational direction. The processor receives a change of rotation command. The processor sends a second activation signal to the second transistor before sending any activation signal to the first transistor to rotate the rotator in the second opposite rotational direction. The second magnetic sensor senses a second change of polarity at a second polarity changing point on the rotor and sends a second triggering signal to the processor. After receipt of the second triggering signal, the processor sends a third activation signal to the first transistor to keep on rotating the rotor in the second opposite rotational direction.

In another embodiment, a first voltage interval is used to characterize the first rotational direction and a second voltage interval to characterize the second rotational direction.

BRIEF DESCRIPTION OF THE DRAWINGS

Henceforth, reference is had to the accompanying drawings throughout the present description for a better understanding of the present inventions embodiments, and given examples, wherein.

DETAILED DESCRIPTION OF PREFERRED EMBODIMENTS

Figure 1:
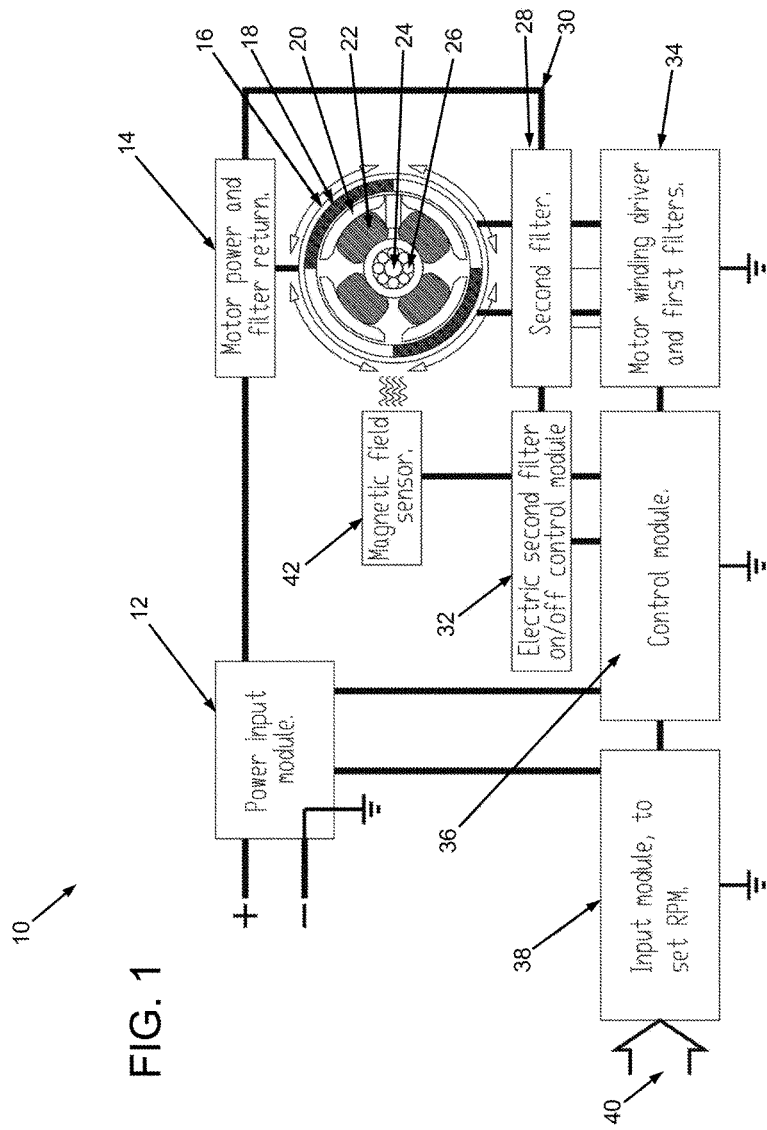
FIG. 1 schematically illustrates a block diagram of the DC motor in accordance with the present invention.

The present invention relates to a brushless DC motor made up of a stator with a number of windings which are magnetized by a current flowing through the different windings. It is to be understood that the invention is not limited to brushless DC motors and that any suitable type of motor may be used. The brushless DC motor is merely used as an illustrative example. The current at least partially depends on the windings number of turns, the area of the wire, and the applied PWM signal. Preferably, the stator windings should be wound so that the required power can be obtained with a high PWM frequency. Because the inductance opposes fast current changes, the windings should have a sufficiently low inductance so that desired current level can be reached. In other words, the stator should be wound in such a way that the desired or required current to achieve the desired rpm can be drawn through the windings can be accomplished at the PWM frequency used. If the inductance is too high, it is not possible to draw the required current by using the PWM signal because the inductance resists rapid changes of the current.

Preferably, the motor rotor is constituted by a magnetic ring which surrounds the stator with a number of magnetic fields, which alter polarity, that have an equal number of magnetic poles as the stator. If the stator has four windings (poles) and the rotor has four magnetic fields, and the windings of the stator are magnetized alternately in different directions of the flow of the current, the rotor will rotate as a result of the magnetic field provided by the stator.

In order to be able to alternate between the different windings at the correct moment, a sensor, such as a magnetic sensor, is utilized which senses when the magnetic field of the rotor changes direction. The sensor is preferably attached in a manner that it senses this change at the correct position relative to the windings of the stator. With the aid of the sensor, the current is alternated through the windings of the stator, so that the poles in the stator pull the rotor magnetic field towards it, and thus forcing the rotor to follow the magnetic field induced in the stator by changing/alternating the direction of the current through the windings.

By varying the strength of the current through the windings, the force of the magnetic field induced in the stator may be controlled, and the higher the strength of the current, the stronger the pulling force of the magnetic field on the rotor becomes and the rotor rotates faster. To control how fast the motor rotates its rotor, it is essential to control the current flowing through the windings. This can be accomplished by varying the voltage applied, or by utilizing the pulse width modulated (PWM) signal which activates transistors that draws current through the windings of the stator with a frequency where the pulse ratio is altered between ON time, and OFF time to alter the speed of the rotor. Preferably, the PWM signal should be at a frequency above 16,000 Hz or higher so that it is impossible or very difficult for a human to hear. Lower frequency ranges may also be used as needed.

Each time current flows through the stator windings, the stator is magnetized with a specific magnetic polarity determined by the direction of the current. The current can flow in two directions through the windings. This may be accomplished by wiring the stator with double cupper wire, which then is connected such as if current is pulled through one of the windings a magnetic field of a specific polarity, south or north, is created at the stator poles, and if current is pulled in the opposite direction, an opposite polarity of the magnetic field is induced in poles at the stator.

This makes it possible to send current each second time through one or the other winding with the aid of the sensor sensing the changes of the magnetic field of the rotor, and thus current through the stator coils creating rotation of the rotor. In order to succeed, the current through the coil of the stator should be quickly suppressed from flowing further when the windings are altered. The winding in the stator acts as an inductance, which prevents quick changes of current through itself, and if a coil is quickly cut off from power a voltage transient occurs, i.e. the current tries to maintain its direction. This voltage transient can be very high, and thus damage the electronics inside the motor and electronics associated with the motor. By positioning a freewheeling diode over the coil, the current will rotate through the diode up to the positive potential of the circuit until it has rung out. This freewheeling current magnetizes the stator winding, which was just cut off, a while after a change of winding, which provides a retarding effect on the motor, and a certain increase of heat in the windings. Hence, it is often not possible to quench this transient by a freewheeling diode. If a zener diode is attached together with the freewheeling diode so that the voltage above a predetermined level freewheels, an enhancement is achieved, but there still remains a force. This remaining lower force partly depends on the zener voltage. A higher voltage on the zener-diode lowers the counterforce that tries to hinder the rotation of the rotor of the motor. In general, the higher the voltage of the zener diodes the lower the remaining power/force is.

It was also surprisingly discovered that by attaching an un-polarized electrolyte capacitor between each winding, the sound from the transients may be suppressed or eliminated. It is important to suppress the transients because they create an electric ticking inside the motor due to the energy that has to be diverted when altering between the windings in the motor. This electric noise may be an insignificant problem when a fan is operated at a high speed because the noise from the fan itself overrides the electrical noise from the motor. However, when the speed of the fan operates at a low speed (so that the fan blades create no or very insignificant sound/noise) then it becomes more important to suppress or eliminate the electrical noise. More particularly, when the fan motor operates at a high speed, the sound from the fan blades is louder than the sound from the fan motor but when the fan motor operates at a low speed then the sound from the fan blades is not louder than the ticking sound from the motor during operation. It is therefore particularly desirable to suppress or reduce the noise from the electrical motor and other components in the circuitry when the fan motor operates at a low speed (below 1500 rpm). The present invention provides a method for effectively removing or suppressing the electrical noise, and for enabling the brushless DC motor to operate electrically in a quiet way, which is important when the motor operates at low revolutions. Such a motor may, for example, be used in household electrical appliances such as desktop fans, computers, bathroom fans, ventilation fans, and the like, which should be as quite as possible, and controllable regarding their revolutions to be altered when needed due to cooling/ventilation and other purposes. The motor of the present invention can be utilized in other appliances/apparatuses particularly where it is important that the motor operates quietly even at low speed without creating any undesirable electrical noise. A solution to the electric noise problem, according to the present invention, involves a double wound stator, i.e. a stator with two wires which are simultaneously wound on the poles of the stators all poles. When the current through these windings is altered, every second pole then creates a rotating magnetic field in the stator that pulls the rotor.

To control these windings two transistors may be used which are able to connect each one winding to ground. The other end of the winding may be connected to a joint point. The joint point may be connected to the positive circuit terminal potential in such a manner that the driving transistors can pull current through the winding from the positive terminal to the negative through each winding, and thereafter ensure that the transistors are controlled by a sensor, which senses the magnetic field of the rotor, and transmits its signals to the input of the AND gate and by using the high frequency PWM signal to the other input on the AND gate. For example, the sensor could be a magnetic sensor that senses the change of the polarity of the magnetic field. The output of the AND gates is, preferably, connected to each transistor via the first filter. This makes it possible to control the current through the windings by using the duty cycle of the PWM signals.

This solution can also be used with a reverse coupling where the common point of the coils is connected to GND and the driving transistors are connected to the positive voltage and then to the coils. This type of connection is slightly more complicated to use but is fully possible. The AND gate function can also be created inside a microcontroller and in such cases the sensor signals are connected to the micro-controller and then the micro-controller sends out the PWM signal to the driver transistors at the right time based on the sensor signals received from the magnetic sensor.

When these transistors, such as conventional field effect transistors (N-FET), are activated they are to open smoothly, i.e. not opened too fast to prevent electrically created noise in the motor. This smooth opening of the transistor is accomplished through an R/C filter, referred to as a first filter or truncating device 34 in FIGS. 1-2 where the resistance R connects to the gate of the transistor, and the capacitor C is attached to ground/negative potential. The first filter ensures that the pulses have a rise time which allows the transistors to open smoothly. More particularly, an N-FET transistor begins to open at a certain voltage level and is fully open at a higher level. If the PWM signal is used to control the gate at the transistor and the PWM signal is truncated and thus has a certain rise time, then this rise time permits the transistor to open from being fully closed to fully open during the rise time of the PWM signal. The rise time of a truncated signal when the PWM signal is at about 16 kHz could be in the range of 150 nanoseconds and 500 nanoseconds while the rise time of non-truncated signals could be in the range of 5 nanosecond and 100 nanoseconds. More preferably, the rise time of the truncated signals should be in the range of 150 nanoseconds and 250 nanoseconds.

When the transistor is closed a diode is, preferably, attached over the resistance R so that the capacitor C is quickly drained and then quickly stops the current flow through the transistor. With this type of filter solution, it is possible to control the transistors by using the PWM signal, thus being able to vary the current flowing through the windings, and thus the rotation speed of the rotor of the motor. The transistors may thus be alternated with the PWM signal to at least two different windings by the aid of the sensor, which detects the magnetic field from the rotor, and the current through the windings is controlled by the PWM signal. More particularly, the bipolar electrolyte capacitor works in the sense that when the transistors switch then the side that was positively charged is connected to GND via the second transistor that just began to conduct current while at the same moment the first transistor stops conducting current.

The first transistor, that just ended leading current, releases its capacitor side from GND and this side of the bipolar electrolyte capacitor then goes up to a voltage limit as determined by the zener diode. In other words, the zener diode may be used to set and limit the voltage level the bipolar electrolyte capacitor is permitted to reach. In this way, the voltage transients may be reduced caused by a transistor that has just ended leading current. The current flows into the bipolar electrolyte capacitor and starts to fill this side of the capacitor with a polarity that is opposite its previous polarity when the other capacitor side is now connected to GND and then empties the earlier charge through the coil driving transistor which switches the previously positive side of the bipolar electrolyte capacitor to GND.

As mentioned above, the PWM signal frequency should be above the conventional hearing frequency of a human being, for instance in the range of 16000 Hz and above. The range 16000 Hz should be regarded as a benchmark, and not as an absolute value in the scope of the present invention. It is also possible to use frequency ranges below 16000 Hz but one disadvantage of using a lower frequency range is that humans can hear the signal. Preferably, N-FET transistors are used but it is also possible to use other types of suitable transistors.

Figure 2:
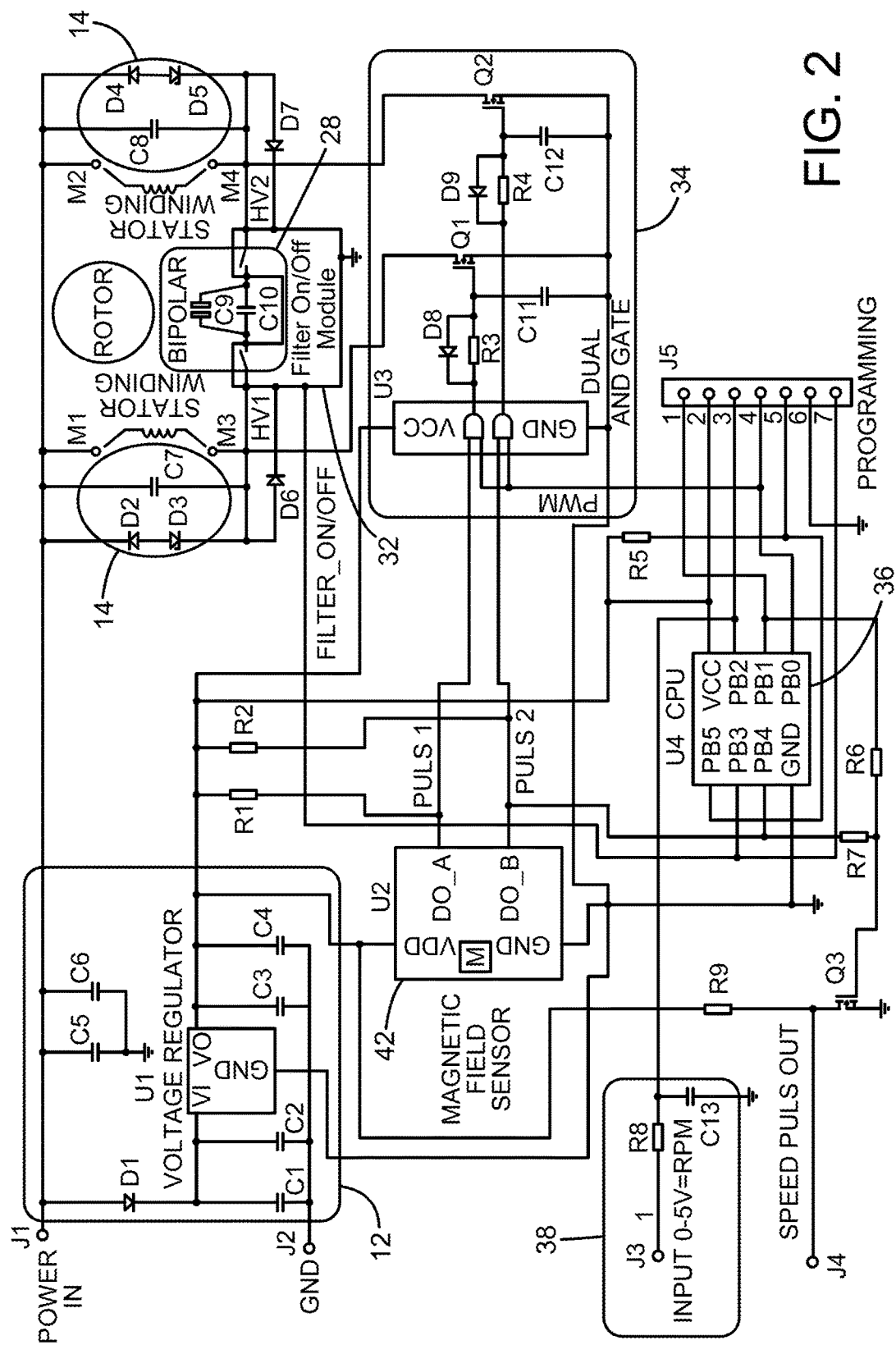
FIG. 2 illustrates a first embodiment of an electric circuit diagram utilized to drive a motor in accordance with the present invention.

As the transistors are alternated switched, the problem of suppressing the electrical noise created when the transistor stops conducting current is solved by attaching a non-polarized electrolytic capacitor between the windings, referred to as a second filter 28 in FIGS. 1-2, and two zener diodes, which limit the voltage transients to a predetermined level.

The voltage level of the zener diode plus the diode voltage should not exceed the voltage level that the electronic-circuits integrated and non-polarized electrolytic capacitor in the motor can handle. If the maximum voltage level of the motor circuits is exceeded there is a risk that the transients may destroy these circuits. The zener voltage level is determined by what voltage the other involved components and/or circuits can withstand. Alternatively, the non-polarized electrolytic capacitor may be constituted by two serial connected electrolytic capacitors with altered polarity to make up the second filter. In other words, it is possible to use a conventional electrolyte capacitor and connect it so that either plus-to-plus or minus-to-minus is connected together and the other sides are connected to the windings which may be illustrated as −++− or +−−+. This is one way of creating the non-polarized capacitor.

The non-polarized capacitor may be loaded by the energy from the coil that is just disconnected from GND through the driving transistor, when the other transistor has just connected its side of the non-polarized capacitor to GND/minus potential, and when there again is a switch between transistors. Preferably, the other side of the non-polarized capacitor is connected to GND and then the previously charged side is emptied to GND, and the other side of the non-polarized capacitor is loaded with the energy from the momentarily detached coil. The non-polarized capacitor can also be connected in parallel with a ceramic capacitor to further enhance the effect of this connection and also to manage the EMI/EMC problem. Also, an up-transformed voltage occurs over the zener-diode and diode combination that limits the voltage transients. This higher voltage across the zener diode plus the diode can be used for powering up a circuitry that can disconnects the capacitors in the filters when the noise level of the fan blades is so loud that the filter is not needed. The circuit may be controlled by a control signal from the CPU or electronic circuit that in turn controls when it should connect or disconnect the capacitors in the filter based upon the rpm of the motor. One advantage of cutting off the filter capacitors when the rotors rotate fast is that the capacitors reduce the efficiency ratio of the motor somewhat, so when the filter are disconnected the efficiency ratio of the motor increases. As mentioned above, it is desirable to turn off both the first and the second filter when the sound from the rotating fan is louder than the electrical sound from, for example, stator coils that are turned on and off.

This disconnection of the filters happens when the motor is rotating at a high rpm. As also mentioned above, the CPU may be used to generate and deliver the output PWM signal at a high frequency above for instance 16000 Hz which in its turn is a signal to the double AND gate function internally in the CPU or externally. The PWM signal is, preferably, AND functioned with the signals from the magnetic field sensor which detects the rotors magnetic field. The sensor may be a hall-sensor that has a complementary output. Regarding the expression AND gate function it is introduced to include all circuits that are able to provide an AND function. The AND function can be a function included in the CPU.

This means that the PWM signal, preferably, reaches the coil driving transistors via these AND function gates so that the transistors receive an alternating PWM signal depending on the magnetic polarity and position of the magnetic field of the rotors contra the stator. Moreover, the CPU/electronics has an input for detecting the signal from the magnetic sensor, thus being able to sense how fast the rotor is rotating, and the CPU/electronics is thereby able to control its PWM output to maintain a constant revolution (i.e. rotational speed) of the motor rotor at a varying load. This control is an important feature of the present invention.

In order for the CPU/electronics to be able to "know" at which speed to operate the motor, it should be fed some type of command. One solution to this problem is to feed the CPU with a voltage controlled signal for instance in the range of 0 to 5V, which means that the motor may keep a certain revolution for instance in one embodiment 500 revolutions/volt input to the CPU, which in this embodiment means a maximum revolution of 2500 revolutions.

By introducing such a solution for revolution control, it is important not to let the motor rotate faster than what it is capable of maximum load. For example, if the motor is capable of rotating at 2500 rpm at maximum load it will rotate faster if the load is decreased, unless the CPU/electronics does not decrease its PWM signal to keep the rotor at 2500 rpm.

The CPU/electronic circuit may also receive a signal from the sensor, which detects the magnetic field of the rotor which signal is utilized to create a regulation loop to keep the speed/revolutions of the rotor constant at an rpm that is independent of the load. To be able to control the motor there should be a sensor attached, which detects the magnetic field from the rotor, typically a hall-sensor such as the UTC UH277 which may be a Latch-Type Hall Effect sensor with built-in complementary output drivers from UNISONIC TECHNOLOGIES CO., LTD. It can also be a sensor with one output and then the CPU or an external electronics circuit creates a complementary output signal. That signal is connected to the PWM signal in such a manner to provide the PWM signal to the driving transistors during the time the magnetic sensor senses the magnetic field, typically via the AND gate function. It is also possible to delay sending the PWM signal after receipt of the triggering signal from the sensor, such as a magnetic sensor that senses a change of polarity of the magnets on the rotating rotor. If the motor stator is constituted by two windings, two driving transistors are required, which are alternately driven when the pulses from the magnetic sensor which is AND functioned with the PWM signals. The output from the AND gate reaches the driving transistors gate via the first filter. One side of the stator windings is wired to the positive potential, if it has two windings one side of these windings is wired to the positive potential, but they are connected to direct the current in different directions through the windings when their driving transistors open up to GND and current starts to flow through the windings. On the lower side of the windings at the side of the driving transistors the bipolar electrolytic capacitor is connected between the windings, and between the windings in parallel with the capacitor which may be a ceramic capacitor if needed. The zener diode/diode combination or TVS (type Bidirectional Transient Voltage Suppressors, such as ON Semiconductor 1SMA15CAT3G) is connected as a voltage transient protector circuit in parallel with each winding. The voltage over this zener diode can be varied, but is typically 15 V at 12 V supply voltage. The anode of the zener diodes is connected to an anode on a diode which leads to the supply voltage to prevent the current from going through the zener diodes in the wrong way. In parallel with these zener diodes/diode connections, a ceramic capacitor may be attached with a relatively low value of approximately 100 nF. A voltage over this diode combination is created when the motor is operated. The higher voltage across the zener diode plus the diode (higher than the supply voltage) can be used for powering up an circuitry that can disconnect the capacitors in the second filter with N-FET transistors when the noise level of the fan blades is so loud that the filter is not needed. This circuit is controlled by a control signal from the CPU or electronic circuit that in turn may be used to control when it should connect or disconnect the capacitors in the second filter based upon the rpm of the motor.

The FET transistors, which draw current through the stator windings has the first filter connected to the gates of the transistors so that they can operate smoothly to avoid a clicking/snapping sound from the stator/motor when they operate, the filter time constant is, preferably, determined by the frequency of the PWM signal, and in some cases also by other factors. The current through the transistors decreases with increasing filter time, the shorter the filter time the higher current per PWM pulse, i.e. the transistors open faster. In general, the duty cycle of the PWM signal is a more important factor when it comes to changing the current through stator coils such as how long the PWM on time signal is on versus PWM off time and the frequency of the PWM (Pulse Wide Modulated) signal. The undesirable sound/noise filtered in the circuit of the present invention originates from the stator windings, which without a proper control act as speaker coils, and produce a more or less weak ticking sound/noise when they are magnetized by the current, and from the voltage transient as the coil is demagnetized. All the electronics needed can be embedded in the motor which may have or four wires depending on if one signal is utilized for reading the rpm or not. Without reading the rpm, there exists a positive, and negative voltage feeding, and a signal for a determined revolution, or adding the revolution signal rendering in four wire connections. If the motor is controlled by serial data on a data bus, it may have three or four wire connections dependent on if data is only transmitted to the motor or in a duplex communication. Many different types of input signals may be used to control the rpm of the motor. For example, voltage signals, current signals, wireless signals, serial data or any other suitable type of signal may be used.

The PWM signal has at least two functions. One is to switch the driving transistors with a frequency that is preferably difficult to hear by a human, and the other is to determine the current through the stator coils in the motor, and at the same time to also make it possible to control the rpm of the motor.

Concerning the higher voltage received over the zener diodes (higher than the supply voltage), it can be utilized to control a pair of N-FET transistors as analog switches. These require a higher voltage on the gate than at the source connection, which is accomplished by using the higher voltage that occurs over the zener diodes. This voltage is the zener voltage higher than the supply voltage. It is also possible to disconnect the capacitors in the second filter with P-FET transistors, which open at a lower voltage at the gate than at the source. However, these are more expensive and often hard to find with a low on-resistance such as a drain source on-state resistance (RDSon).

It is further appreciated that at least one of a central processing unit or an electronic circuit, is provided with an input signal (such as a triggering signal) from the magnetic field sensor to determine at which rpm the motor is operating and where the rotor is located in relation to the stator. This is an input signal that indicates how fast the motor rotates. Moreover, it is possible that the motor is controlled through revolution feedback control with this magnetic field sensor as a feedback of the rpm. It is also possible to control the motor without revolution feedback control. If no feedback control is used, then it is easier to develop the electronics of the motor but the motor drops in revolutions if the load increases. This means that if the motor has an impeller and works as a fan then the revolutions varies with the backpressure, the motor may change its revolution depending on the load of the motor and the motor efficiency. When a motor is controlled through revolution feedback, the motor tries to keep its speed constant as ordered by the input signal. The motor keeps the speed relatively constant as long as the load does not exceed the maximum motor efficiency. Preferably, the motor should be designed for different efficiency depending on the normal power needed for the application.

FIG. 1 depicts a block diagram of the direct current motor 10 of the present invention. The motor 10 with its circuit is illustrated by a power input 12 and a motor power and transient voltage filter return 14. Preferably, the motor has a magnetic ring rotor 18, with a rotor 16 disposed within the motor as well as a stator 20 with its stator windings 22, and a rotor shaft 24, and its bearing 26 for the rotor 16 to be able to rotate. Also depicted is the second filter 28 that is used to suppress noise/sound in accordance with the present invention. Reference numeral 30 is used to depict the voltage protection return path up to filter return 14. FIG. 1 also shows a magnetic sensor 42.

The electric sound/noise on/off control switch 32 may be utilized when for instance a fan noise itself overrides the electrical induced noise from the motor 10. In other words, the switch or control module 32 may be used to turn off the noise reducing functions of the first filter 34 and the second filter 28 when the noise from the fan blades is louder than the noise from the fan motor and other electrical For example, in conventional motors, the noise from the fan blades is often louder than the electrical noise from the motor when the rpm is above 500 rpm, and more preferably when the rpm is above about 1000 rpm. The exact rpm depends on the motor and the type of fan blades used. This means the first and second filters may be disconnected at the above rpm ranges to improve the efficiency of the motor. Because the motor of the present invention is so quiet, it is possible run the motor at about 500 rpm or below without hearing the electrical noise such as clicking sound when the transistors are turned on and off. One advantage of turning off the filters 28 and 34 at rpms above 1000 rpm is, thus, that the efficiency of the fan motor increases because the filters "steal" some efficiency. The first filter 34 may include a motor winding driver. A PWM and RPM control module 36 is shown which maybe a CPU or an electronic circuit. Input module 38 for a speed demand can for instance be applied by serial data, voltage or current control. An arrow 40 depicts the input speed demand on the motor, which can be serial in one embodiment controlled by voltage and/or current. FIG. 1 shows one possible embodiment of a motor according to the present invention.

In FIG. 2 one embodiment of an electric circuit diagram is illustrated that is used to drive the motor, in accordance with the present invention. FIG. 2 shows a magnetic sensor 42, the power input 12 such as a voltage control, the control module 36 such as a CPU, and the second filter 28. The first filter 34 controls the gates of the two driving transistors Q1 and Q2. Each first filter 34 may be constituted by diodes D8, D9 in parallel with two resistors R3, R4, and capacitors C11, C12 connected from the gate to ground and including the AND gate function as a dual AND gate shown in FIG. 2. Hereby, as mentioned, the first filter 34 opens and closes the transistors in a smooth manner so that the transistors open relatively slowly as a result of the truncated PWM signals, as explained in detail above.

The second filter 28 is, preferably, constituted by a bipolar capacitor C9 in parallel with a ceramic capacitor C10 that may be used to suppress the clicking noise of the motor as a result of the capacitor absorbing the transient energy, as explained in detail above. A voltage protection 14 is shown suppressing voltage transients to a zener voltage level due to the inherent buildup of an induced magnetic field in the stator windings when altering the direction of current through the windings. The voltage protection 14 is constituted by diodes D2, D4 in series with zener diodes D3, D5, in parallel with capacitors C7, C8. Zener diodes D3 and D5 open at a predetermined zener voltage. A higher voltage that is built up over these diodes by the voltage transients is going to the on/off module 32 through D6 and D7 and is utilized to power up a switch function in module 32 to disconnect the second filter 28 when for instance the fan blades (impeller) are rotating so fast that the sound from the rotating fan blades is louder than the clicking noise of the motor itself. The control module 36 may control when to disconnect the capacitors in the filters based upon the rpm of the fan motor.

Figure 3:
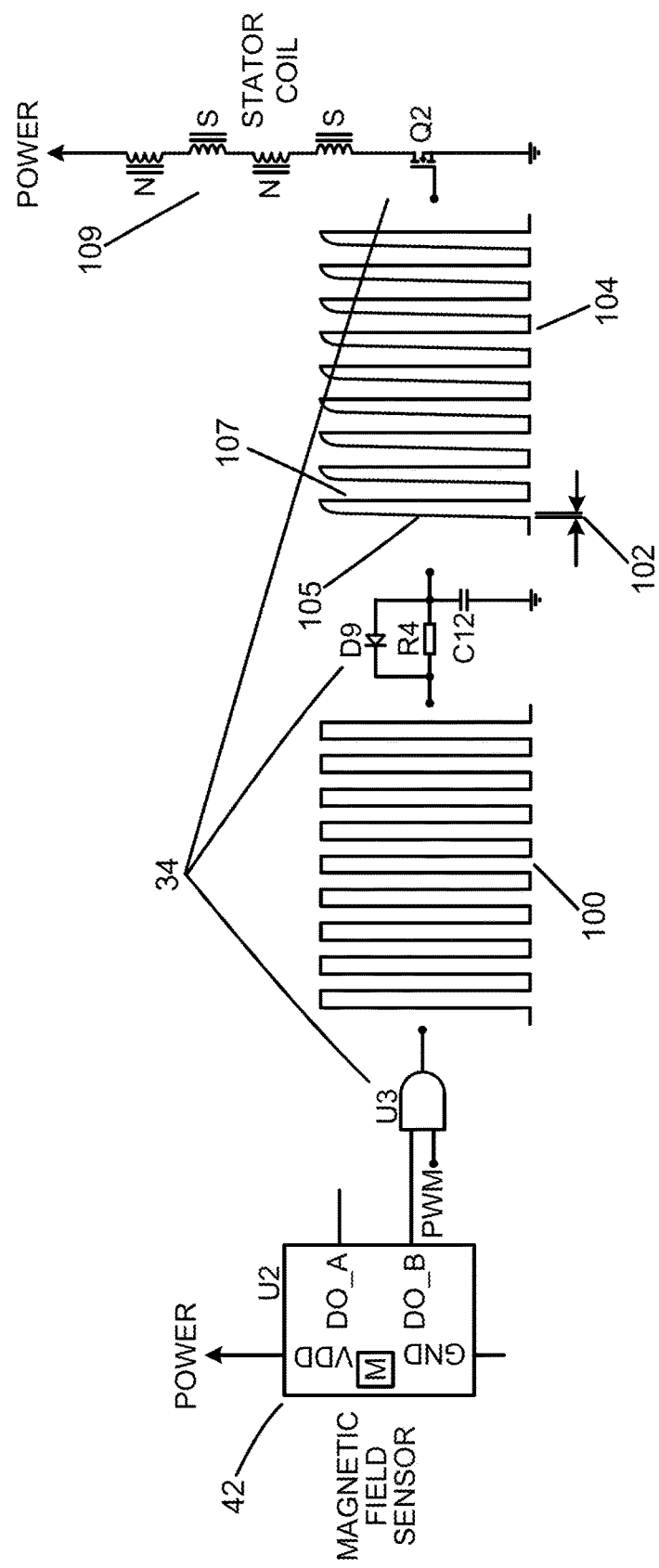
FIG. 3 is a schematic illustration of truncated PWM signals in the first filter in accordance with the present invention.

FIG. 3 is a schematic illustration of how the PWM pulses changes from pulses with tremendously fast rise time to pulses with longer rise time 102 so that the driving transistors open up softly and close fast as a result of the truncated PWM pulses 104. PWM pulses 100 are un-truncated before the pulses pass the first filter 34. More particularly, the magnetic field sensor 42 opens up the AND gate U in the first filter 34 at the right moment and then the PWM signal reaches the R4 and C12 in the first filter 34 that truncates the up-going flank of the PWM signals 104. The diode D9 in filter 34 leads the current from C12 really fast to get a fast off time when the AND gate output goes low. This produces the soft rising PWM pulse 104 that has the truncated flank 105 and a fast falling pulse time 107. The PWM pulse 104 goes to the gate on the driving transistor in the first filter 34 that drives the stator coil 109 in the motor. Equivalent circuits exist for the other coils.

Figure 4:
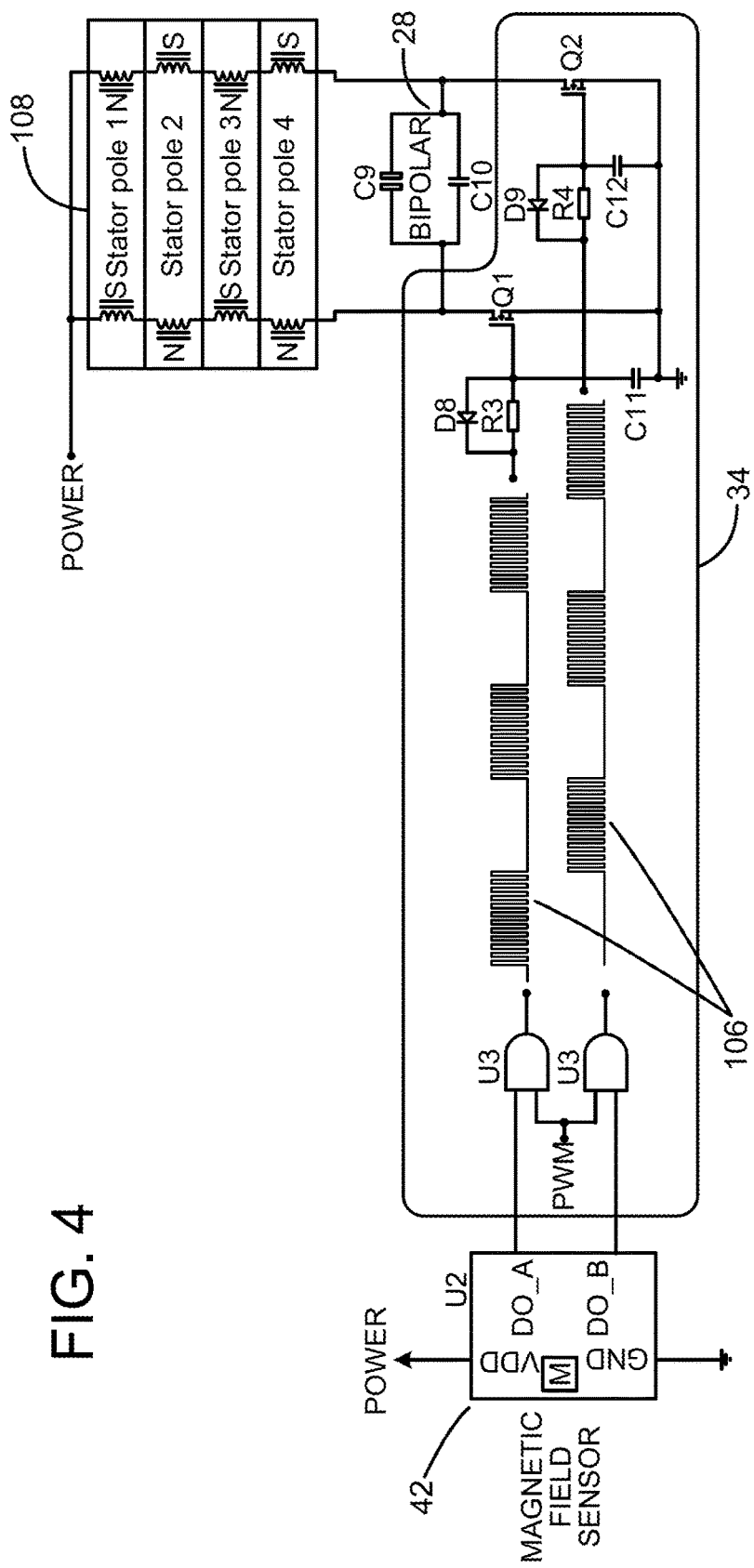
FIG. 4 is a schematic illustration of PWM signals going to the driving transistor in accordance with the present invention.

FIG. 4 is a schematic illustration of how the PWM pulses or bursts 106 go into the driving transistors via the circuits that change the rise time of the PWM pulses. As mentioned earlier, the driving transistors drive each coil placed in the stator poles 108. The coils are wound so that the polarity N and S of the stator poles changes depending upon which transistor Q1 or Q2 conducts current through the coils. In other words, the stator is wound in such a way that the stator poles change their polarity when the transistors Q1 or Q2 conduct current through the stator windings alternatingly.

The current through the coils may be controlled by the duty cycle of the PWM signals. This in turn controls the magnetic force at the stator poles. In this way, the rotational rpm of the motor may be controlled. More particularly, the magnetic sensor 42 opens the AND circuits U3 in the first filter 34 and puts out the PWM signal 106 depending upon the magnetic polarity sensed by the magnetic sensor. The PWM signal 106 is then used to drive the driving transistors Q1 and Q2. The first filter 34 that is used to change the rise time of the PWM signal is associated with the circuits D8, R3, C11 and D9, R4 and C12 before each coil driving transistor Q1 and Q2, respectively. The second filter 28 is associated with the non-polarity electrolytic capacitor C9 connected in parallel with a ceramic capacitor C10. The capacitors are used to suppress the undesirable sound that occurs when the transistors alternatingly conduct current.

Figure 5:
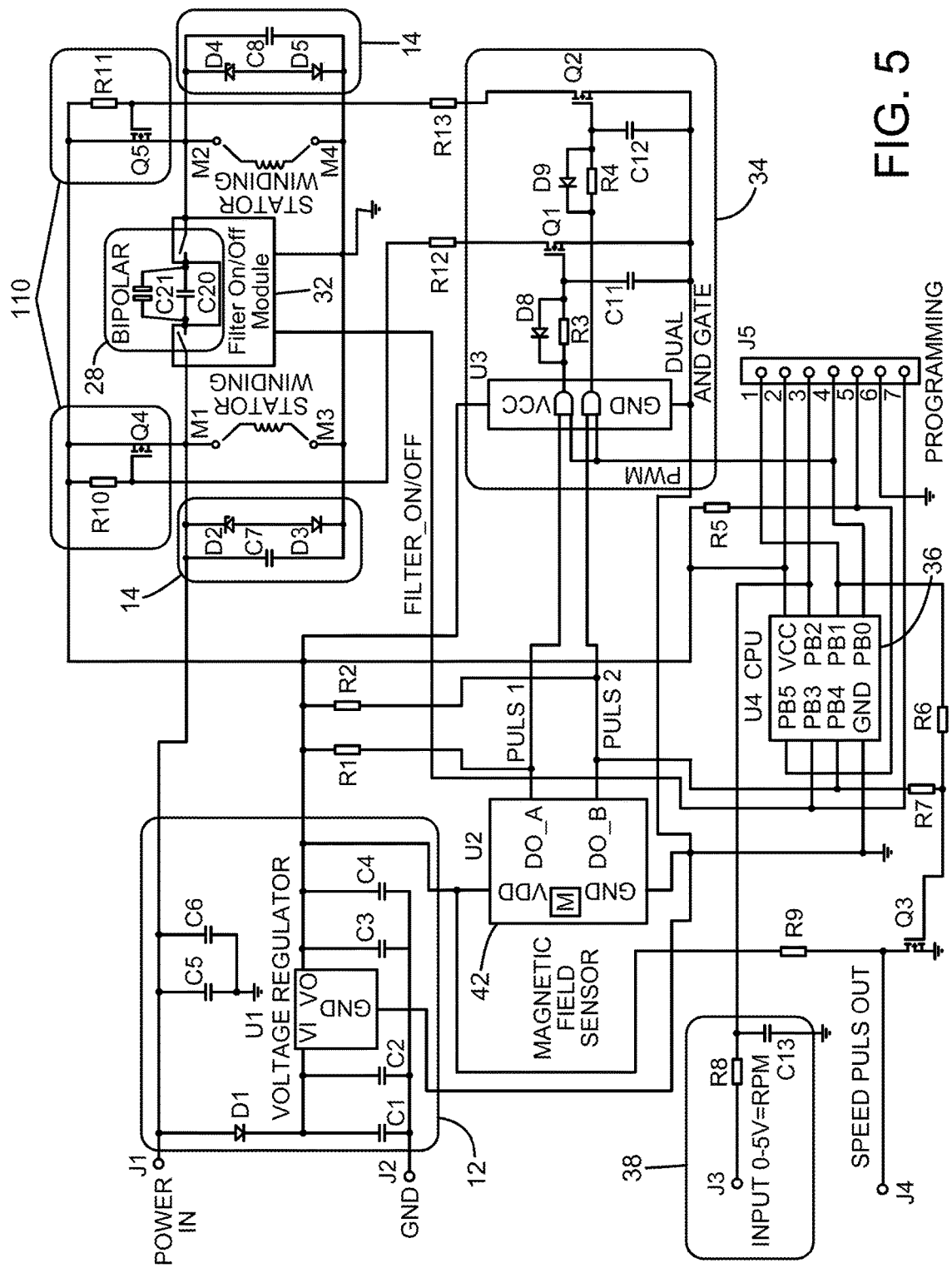
FIG. 5 is a second embodiment of the electric circuit diagram of the present invention.

FIG. 5 is a schematic illustration of a circuit of an alternative embodiment regarding how to conduct current through the windings of the stator. The transistors 110 may be of a P-FET type and they may be controlled by the transistors Q1 and Q2 that drive the coils, as described above. With this design the common connection for the coil is to ground (GND) and the driving transistors conduct current from the plus rail. The voltage transients are negative to GND so in this design there is no higher voltage available to disconnect the non-polarity electrolytic capacitor with. Instead, the disconnection of the capacitors must be solved with a different technic. The conduction of the current from the positive rail may also be done with N-FET transistors but then it is also necessary to use a voltage level shifter for the transistor gate drive. When N-FET transistors are used it is preferable that the PWM signals are operating at a voltage that is higher than the supply voltage such as 5V or higher.

Figure 6:
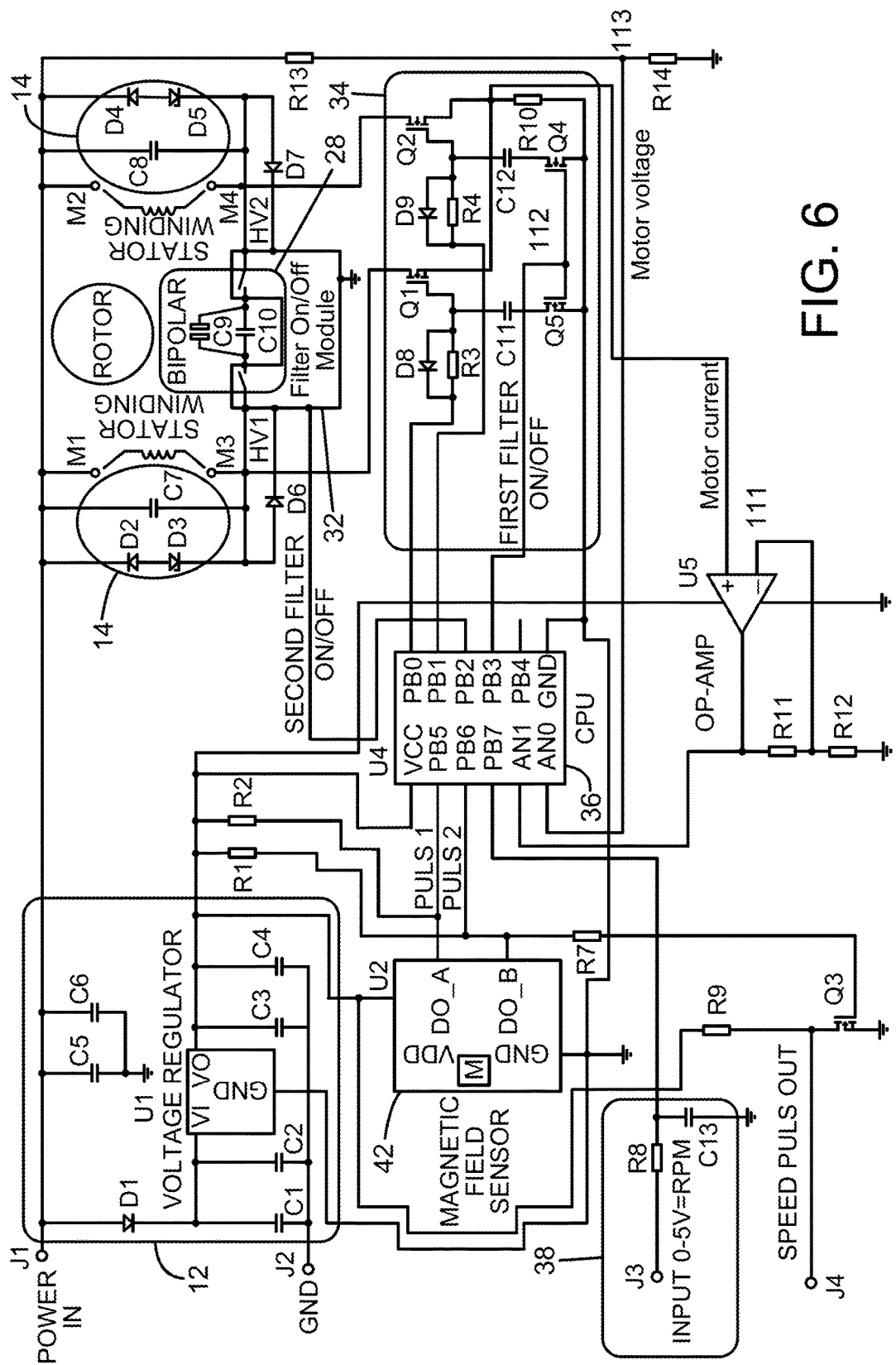
FIG. 6 is a third embodiment of the electric circuit diagram of the present invention.

FIG. 6 is a schematic illustration of a circuit showing a PWM signal that is controlled by a CPU 36 that has an AND functionality integrated therein. The circuit shows how it is possible to measure the current and voltage of the motor power with the CPU 36 and how to control the motor efficiency and rpm by controlling the switching time and duty cycle of the PWM signal. The resistors R13 and R14 may be used to create a voltage divider that adapt the motor voltage signal 113 to the CPU 36. The current of the motor coil passes through the resistor R10 and causes a voltage drop over the resistor R10. The voltage drop may be amplified by amplifier 111 for adaptation to the CPU 36. The CPU 36 now has sufficient input needed for calculating the efficiency of the motor. Preferably, the magnetic sensor 42 is placed so that the magnetic field shifting of polarity occurs before the optimum shifting point for the transistors and coil current. The CPU can now delay the PWM output so that the shifting of the coil will be at the right moment for an optimum motor efficiency and change the switching point depending on the motor load and rpm. The circuit also shows how the CPU can disconnect the first filter 34 with transistor Q4 and Q5 as marked by reference numeral 112.

When the CPU is built into the motor, it is possible to use software to change the switch point when the transistors are switched during operation. In other words, the magnetic sensor of the motor may be used to determine when the switch between transistors should occur. The timing of triggering the switch greatly affects the efficiency of the motor. When this function of the CPU is used, it is necessary to move the magnetic sensor slightly relative to the optimal position because the CPU can only delay the signal to the transistors but not send them earlier. If the magnetic sensor sends the triggering pulse with position information somewhat earlier than the optimal timing it is possible for the CPU to delay the sending of the PWM signal so that it is sent at the right time relative to the rpm and load on the motor (best shown in FIG. 6). This is equivalent to what can be done in a combustion engine when the ignition timing is changed depending on the rpm and load on the engine. With this solution it is also possible to measure the current flowing through the coils. By measuring the voltage connected to the windings it is possible to calculate the efficiency of the motor and then adjust the switching point so that the best efficiency is accomplished.

Figure 7:
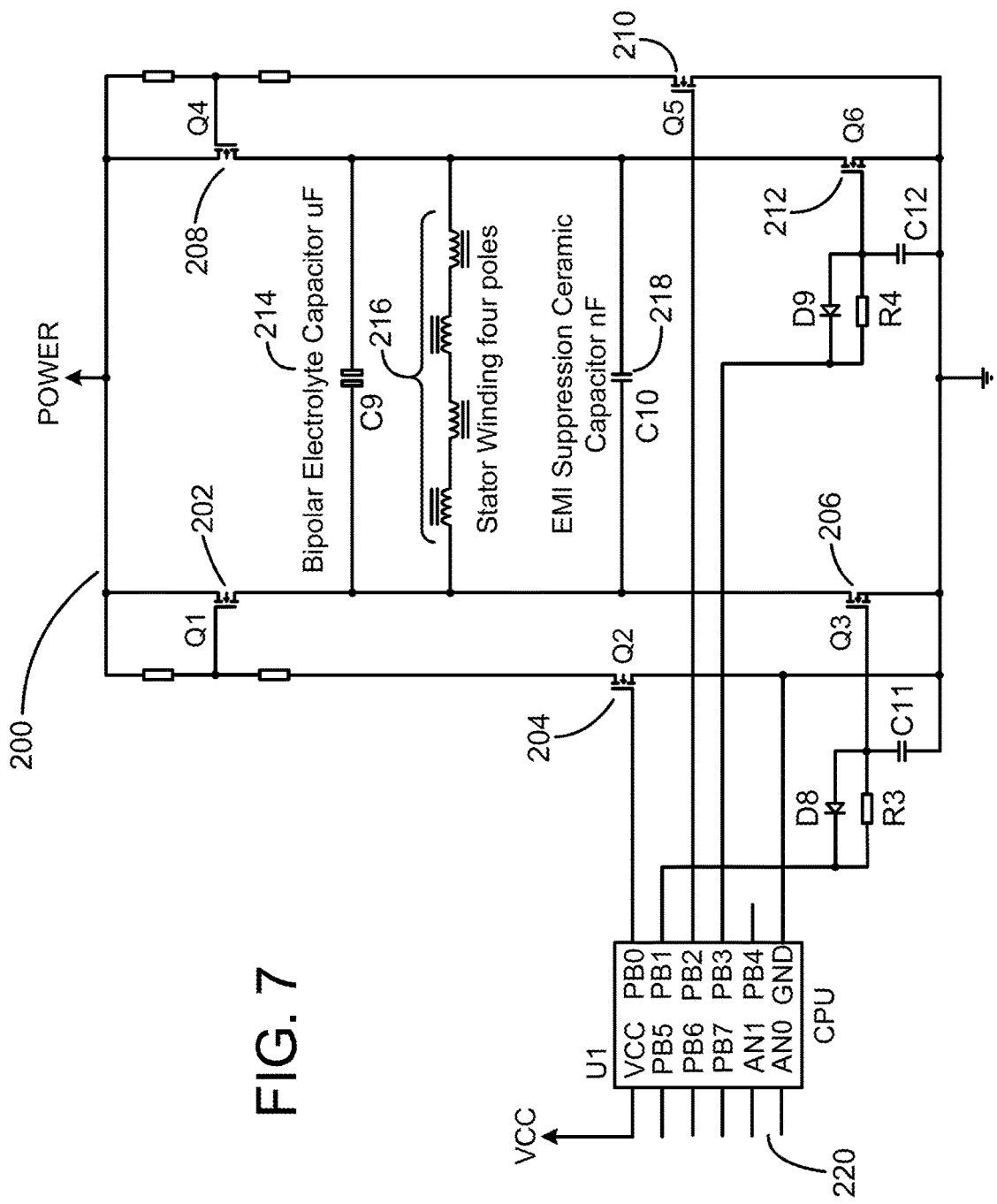
FIG. 7 is a schematic view of an H-bridge that is used in a fourth embodiment of the present invention.

FIG. 7 is a schematic view of an H-bridge 200 that may be used in connection with a fourth embodiment of the present invention. The H-bridge 200 may be used to drive the stator winding 216. More particularly, the H-bridge may, for example, include four transistors 202, 206, 208, 212 connected to the stator winding 216 and a capacitor 214, preferably a non-polarized electrolyte capacitor that is connected in parallel with the stator winding 216. Transistor 202 may be a P-FET transistor that is controlled by an N-FET transistor 204 that, in turn, is controlled by a CPU 220. When the transistor 202 is on, i.e. is conducting current, a PWM signal is sent to the N-FET transistor 212 and current, in a first direction, flows through transistor 202 and further through stator winding 216 and to GND via transistor 212. The P-FET transistor 208 is controlled by N-FET transistor 210 that in turn is controlled by CPU 220. Transistors 204 and 210 are included to obtain shiftable voltage levels because the stator winding is fed with a high voltage and the CPU is fed with a low voltage such as 3.3V or 5V. When the P-FET transistor 208 is on, i.e. is conducting current, a PWM signal is sent to N-FET transistor 206 and current flows, in the second direction, through transistor 208 and further through stator winding 216 and to GND via transistor 206. In this way, the first pair of transistors 202 and 212 may be activate at the same time to conduct current through the stator winding 216 in the first direction while the second pair of transistors 206 and 208 are in-active at the same time. The transistors 202 and 212 may then be de-activated and the transistors 206 and 208 may be activated to conduct current through the stator winding in the second direction that is opposite the first direction. Transient energy may be created in the short time delay between the deactivation of the first pair of transistors 202 and 212 and the activation of the second pair of transistors 206, 208. The transient energy created during this time delay is preferably absorbed in the capacitor 214. The time delay is preferred to avoid or reduce the risk of shorting the transistors. Similar to the embodiments described above, the capacitor 214 absorbs the transient energy created of the current flowing in the first direction during the time delay. When the active the second pair of transistors are again de-activated, and the first pair of transistors are activated, the capacitor 214 absorbs transient energy from the current that flows in the second opposite direction. As indicated above, while the transient energy fills the capacitor 214 in the second direction from the first end of the capacitor, the transient energy that was previously absorbed when the first transistor pair was de-activated is emptied from the capacitor 214 and flows out through a second end of the capacitor.

It is possible to use PNP transistors instead of P-FET transistors and it is possible to use NPN transistors instead of N-FET transistors. It is also possible to use N-FET transistors instead of P-FET transistors but it may then be necessary to use a voltage pump that increases the gate voltage of the N-FET transistors so that they can open and special drivers may be used to adapt to the CPU. Special circuits may be used for this purpose.

Figure 8:
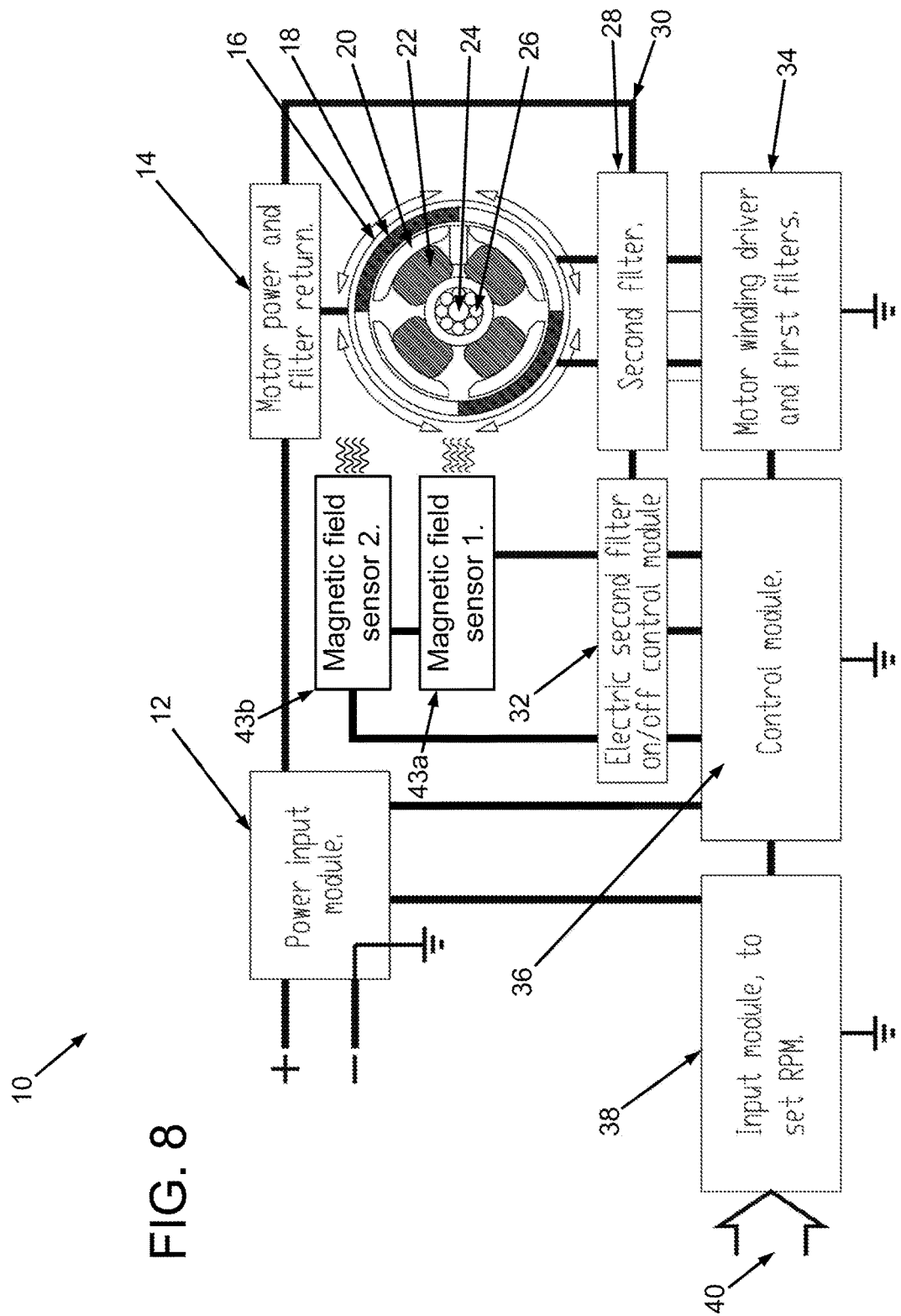
FIG. 8 is a fourth embodiment of the electric circuit diagram of the present invention showing multiple field sensors.
Figure 9:
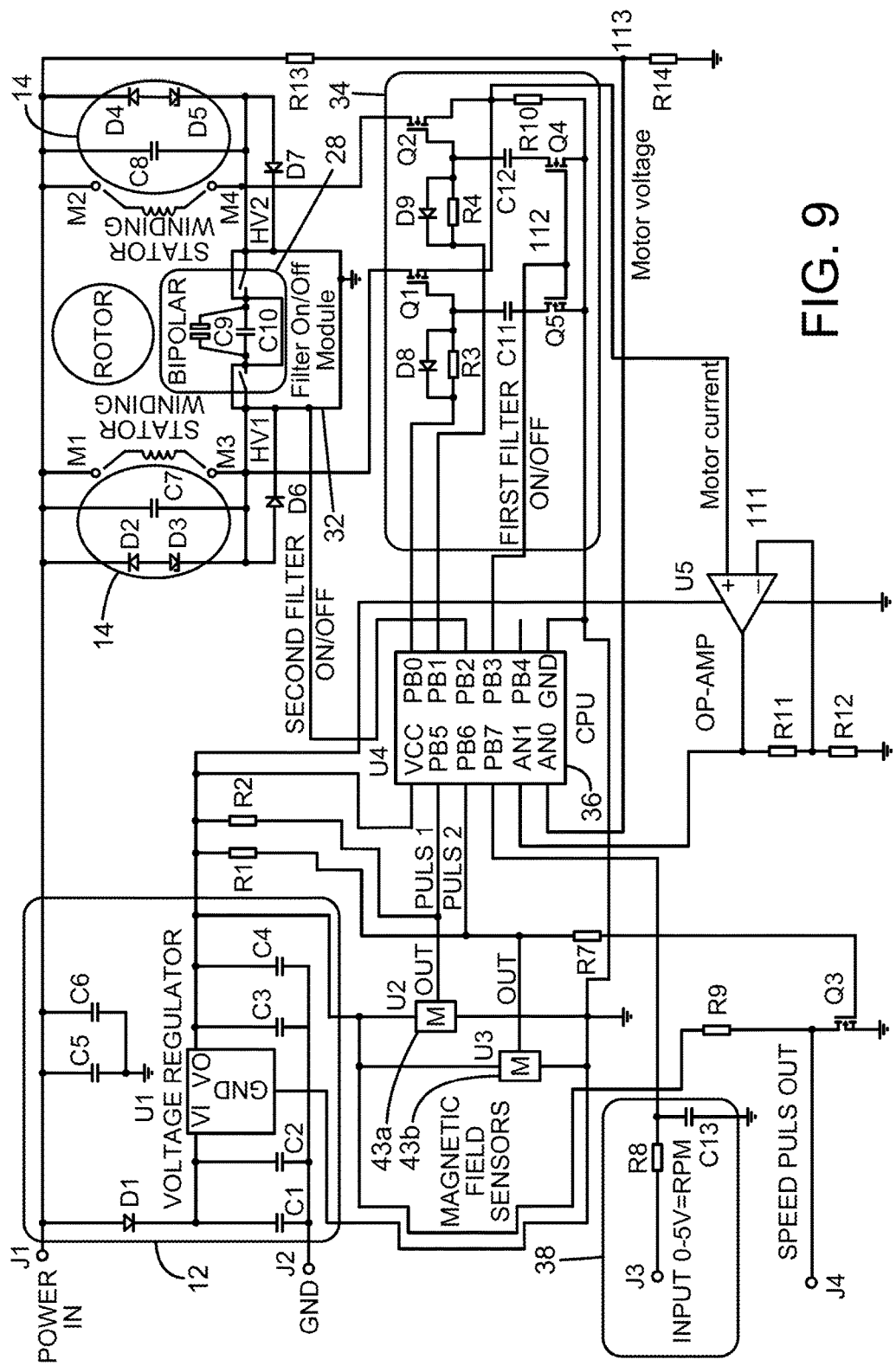
FIG. 9 is a fifth embodiment of the electric circuit diagram of the present invention showing multiple field sensors.
Figure 10:
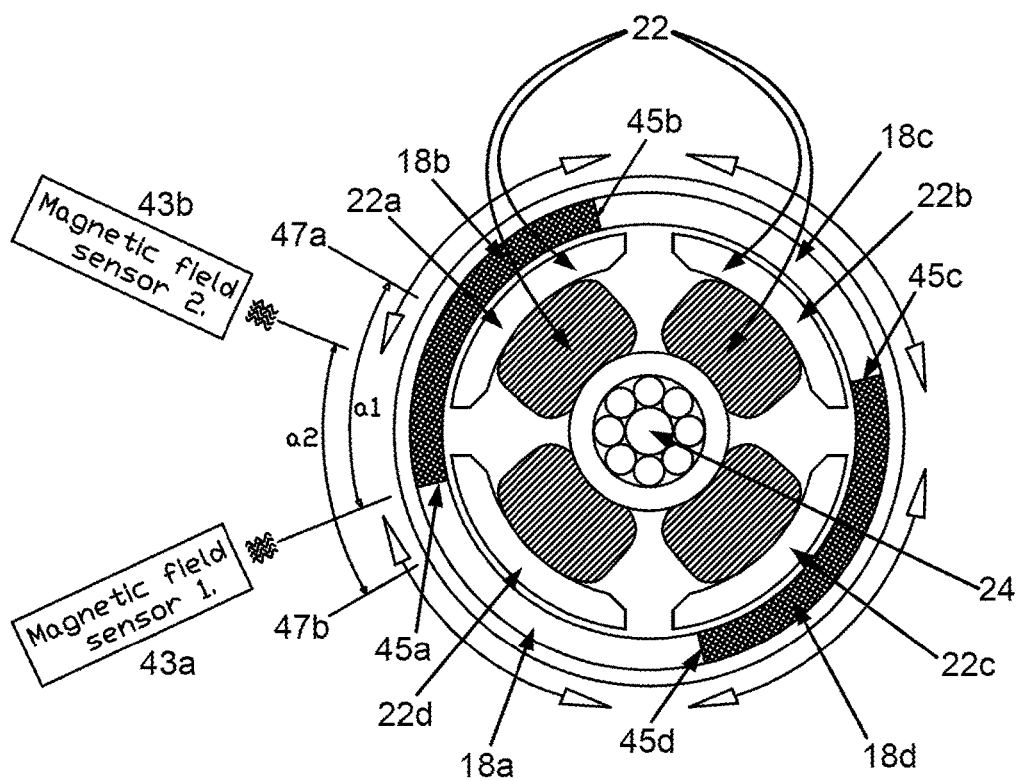
FIG. 10 is a detailed view of the fourth embodiment shown in FIG. 8 when the rotor rotates in a first rotational direction and in a second opposite rotational direction.
Figure 11:
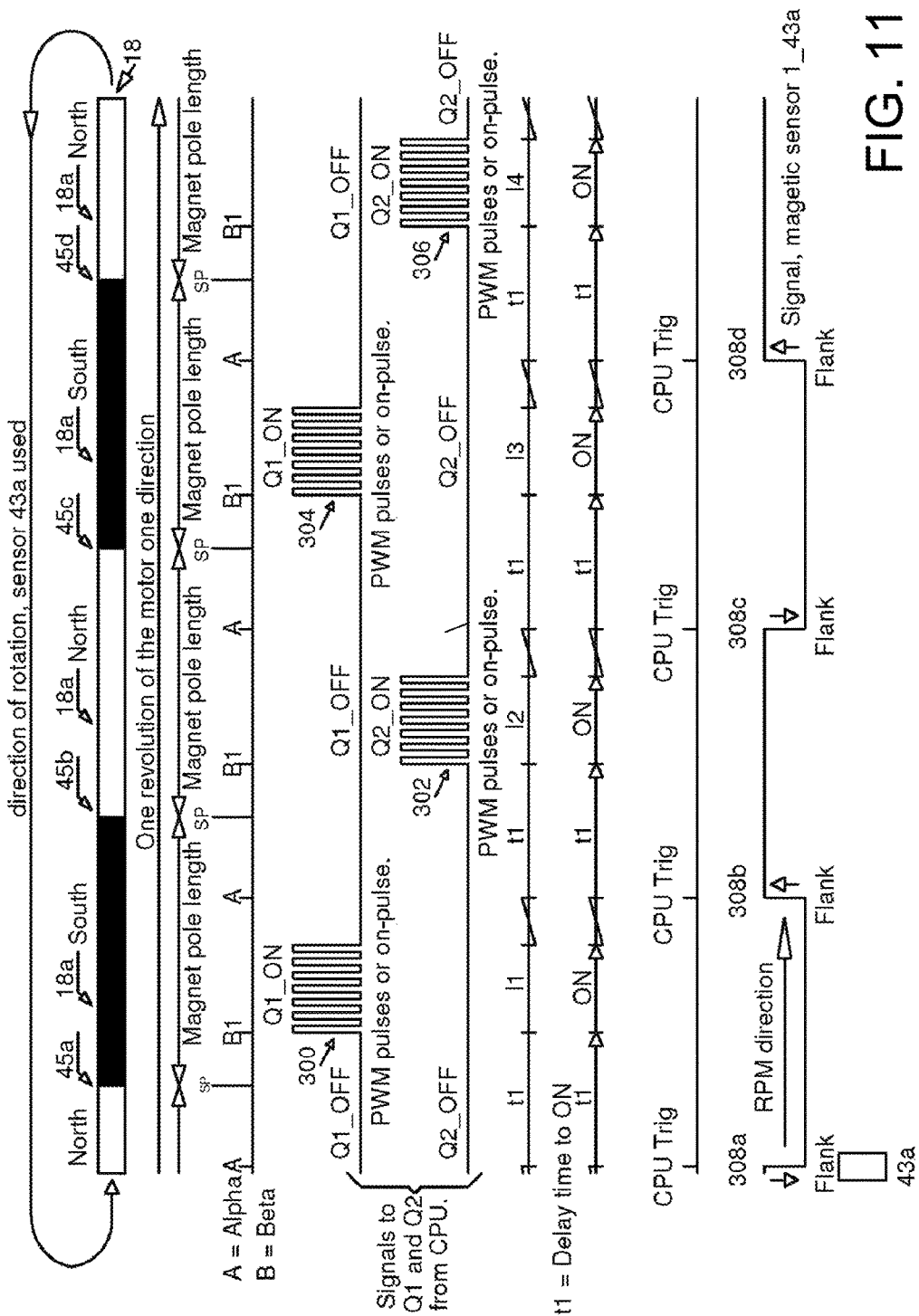
FIG. 11 is a schematic view of PWM pulses sent to transistors Q1 and Q2.

FIG. 8 shows a fourth embodiment that is virtually identical to the embodiment shown in FIG. 1 except that it contains two magnetic field sensors 43a and 43b instead of only one magnetic field sensor. Similarly, FIG. 9 shows a fifth embodiment that is virtually identical to the embodiment shown in FIG. 6 except that it contains two magnetic field sensors 43a and 43b instead of only one magnetic field sensor. FIG. 10 shows a detailed view of FIG. 8 and the position of the sensors 43a and 43b. FIG. 11 shows the CPU delaying, upon receipt of the triggering signal from the magnetic sensors, sending PWM pulses to the transistors Q1, Q2 and how the PWM pulses may relate to the magnets 18a, 18b, 18c and 18d on the rotor 16. It is to be understood that the current invention is not limited to the use of two transistors and that more than two transistors may be used such as four or more transistors. FIG. 11 also shows the magnetic sensor 43a sending triggering signals to the CPU and that the CPU responds at the flank of the triggering signal i.e. edge-triggered. Each time a magnetic pole in rotor 16 changes polarity in front of a sensor, such as when the change of polarity point 45a passes over the sensor 43a, the CPU receives an edge triggering signal, such as signal 308a when point 45a is located at or passes sensor 43a, as shown in FIGS. 10-11. For example, the sensor 43a may send a first flank 308a (such as a negative flank) of a triggering signal when the sensor 43a senses a polarity shift of a magnet, such as magnet 18a on the rotor 16. When change of polarity point 45b passes sensor 43a, a new second flank 308b of a triggering signal is sent to the CPU (such as a positive flank). When change of polarity point 45c passes sensor 43a, a new third flank 308c of a triggering signal is sent to the CPU (such as a negative flank). Finally, when change of polarity point 45d passes sensor 43a, a new fourth flank 308d of a triggering signal is sent to the CPU (such as a positive flank).

An important feature of the present invention is that by using at least two magnetic sensors 43a, 43b to obtain information about where the rotor 16 is located and turned, it is possible to change the rotational direction of the rotor of the motor and to optimize the efficiency of the motor to reach maximum efficiency at each selected revolution per minute (rpm). It should be understood that the present invention is not limited to magnetic sensors and that any suitable sensor may be used. It is important to take advantage of the fact that when many sensors are used, they are not located in the same position and can sense the switching of the magnetic fields, such as the change of magnetic polarity, or any other indication that the sensor type can detect when the rotor is in different positions. As described in detail below, this information may then be used as input into the CPU. When the direction of the rotation of the rotor of the motor is changed from one direction to the opposite rotational direction, it may be necessary to receive signals from different positions of the rotor for each rotational direction.

The CPU may be used to change the direction of the rotor 16 of the motor. There are many ways for the CPU to send switching signals to switch from one transistor to another. One example, as shown in FIG. 6, is to disconnect the current through transistor Q1 via CPU port B0 (PB0) that switches off transistor Q1 while activating transistor Q2 via CPU port B1 (PB1) or activating transistor Q1 via PB0 while disconnecting the current to transistor Q2. The CPU alternatingly disconnects (or inactivates) and connects (or activates) the transistors Q1 and Q2 by sending activation and inactivation signals. In this way, the CPU sends switching signals to the transistors Q1, Q2 to either switch on or switch off the transistors in an alternating way. The switching signal may or may not be PWM pulses. When a transistor is switched on, it conducts a current through the stator winding 22 to ground (GND).

It is also possible to use sensors that have two outlets wherein one operates at a high level and the other at a low level when the polarity of the magnetic field is to be changed. The CPU may also be used to delay sending the switching signals (such as alpha1 (α1) degrees, as shown in FIG. 10) to the transistors depending upon the revolutions per minute and depending upon the input signal from the sensors. This means the CPU sends the switching signal to the transistor when the point 45a passes the transistor activation point 47a located at alpha1 (α1) degrees when the rotor rotates in a first or clockwise rotational direction. When the rotor rotates in a second or counter-clockwise rotational direction, the CPU sends the switching signal to the transistor when the point 45a passes the transistor activation point 47b that is located at alpha2 (α2) degrees passed the magnetic sensor 43b, as shown in FIG. 10. This delay, such as time period (t1) may be used to optimize the efficiency of the motor, as described in detail below and shown in FIG. 11.

By measuring both the current that goes through the motor and the voltage supply to the motor in addition to the revolutions per minute, it is possible for the CPU to optimize the efficiency by varying the switching/activation point of the transistors (i.e. when the switching or PWM pulses are sent) with respect to the input signals from the sensors and the current and voltage signals. In other words, alpha1 (α1) in FIG. 10 is changed or optimized by the CPU. It is a type of an adaptive control where the CPU seeks out the optimal timing for switching the transistors for each desired rotational speed ω (or rpm). In this way, the power consumption of the motor at different selected rotational speeds is optimized.

FIG. 9 shows that it is possible to measure the current that goes through the motor by using R10 which is a resistor with a low resistance over which the voltage drop is measured. It is also possible to measure or determine this current without using a resistor, by using another current measuring technology. This voltage drop or current level signal is then used by the CPU to determine the current that flows through the motor. The motor supply voltage may be measured by using resistors R13 and R14 (voltage divider to adjust the signal level to the CPU) that provide the CPU with information about which voltage is being fed to the motor. Because the CPU has all this input and information, it is possible to adjust the exact time for activating or when to send the activation/signals to the selected transistor in order to reach an optimal efficiency i.e. the minimum power (watts) needed to maintain the correct selected rotational speed ω (or rpm). In other words, it is desirable to control the motor so that it operates at the maximum efficiency and the CPU inside the motor may thus be used to control the motor during operation in order to achieve the best efficiency at each rotational speed or revolutions per minute. This means, it is possible for the CPU to continuously monitor the voltage and the current feeding the motor and, when necessary, slightly change the on-time and the length of the activation/switching signal or PWM pulse/signal during the on-time when the transistors are activated in order to raise the efficiency of the motor. Preferably, the CPU calculates the switching point, i.e. when to send the switching signals to the transistors, based on the received sensor flank-signals 308a-d and revolutions per minute, voltage and the current consumption of the motor.

There are many advantages of using two magnetic field sensors such as sensors 43a and 43b in FIGS. 8-10. For example, by using two sensors it is possible to change the rotational direction of the rotor 16 on the motor. It is desirable that the pulse flanks 308a-d are received from the sensors 43a or 43b a short time period before the actual switching of the transistors should occur depending on the rotational direction. For example, if the rotor is rotating in a first direction and sensor 43a senses that there is a switch in the direction of the polarity of the magnetic field, the current in the stator winding is then switched to flow in the opposite direction after a certain time period (t1) that the CPU has calculated. An important feature is that the switching of the current flow is made a certain time period (t1) or delay after the receipt of the triggering signal 308 from sensor 43a because it has sensed a change of magnetic polarity of the rotating rotor 16 before an optimum switching point. The time period (t1) in FIG. 11 corresponds to the degrees alpha1 (α1) in FIG. 10. This delay improves the efficiency of the motor as a result of the CPU optimizing the timing of the switching of transistors. By continuously controlling or adjusting the time delay, it is possible to optimize the efficiency of the motor. The CPU may be such that it is adaptive and the CPU learns how to set the parameters based on prior input data. For example, the CPU may not only determine exactly when to send the switch on/off signals or activation/inactivation to the transistors but also to vary the length of the PWM pulses or non-PWM pulses in order to reach optimal results (such as the lowest possible current needed to run the rotor). In this way, the CPU tests different timing (such as time delays) regarding when to send the switching/activation signals to the transistors and makes minor adjustments in an iterative manner to find the best parameters for the motor at the particular rotational speed and load on the motor at that particular moment. This means it takes a while for the CPU to determine which parameters it should use at a particular rotational speed in order to find the lowest possible current value i.e. power consumption. Even when the rotation speed is changed or the rotational direction is changed at a previously used rotational speed, the CPU may save the parameters that were best for future use for the corresponding rpm while the CPU tries to further improve the parameters (such as by sending the switching signals to the transistors at slightly different times or making the PWM signal slightly longer or shorter).

This adaptive behavior of the CPU such as the adaptive time delay may be different depending upon the rotational speed of the rotor; the current through the motor (the load) and the voltage to the motor. In this way, a different time delay is used when the rotational speed is high compared to when it is low in order to optimize the efficiency of the motor. The CPU may determine which time delay is the most effective by using parameters such as the rotational speed, the current and voltage used to determine the effect of the motor. For example, the CPU may determine by making a slight adjustment of the time delay, such as changing the time period (t1) to time period (t1') that the current is reduced while the rotational speed is maintained which means the efficiency of the motor has improved. Because the triggering flank signals 308a-d from the magnetic sensor 43a or 43b are received by the CPU before the actual switch of transistors Q1, Q2 is to occur, there is time for the CPU to determine which time delay (t1) should be used before the current is switched to the opposite direction through the motor windings. As indicated above, when it is desirable to reverse the direction of the rotation, it is important to have two sensors because if only one sensor is used then that sensor would receive the pulse too late in one direction. The CPU knows which sensor signal that it must use depending on the desired rotational direction of the rotor 16.

The command for a change in rotational direction may be sent to the CPU in many different ways. For example, the voltage may be used so that in an interval 0-5V, any voltage value between 2.5-0V represents a rotation in a first direction while voltage values in the 2.5-5.0V range represent rotation in the second opposite direction. At 2.5V, the rotor would not rotate at all and be at a stand-still. Another way is to use a serial communication to the motor. The impeller of the motor may be designed so that the air flows in different directions depending on the direction of the rotation of the fan motor i.e. the air is forced to either flow into the fan or out of the fan.

In operation, the CPU 36 sends a first activation or start signal (which may or may not be PWM pulses, as shown in FIG. 11) to the first transistor Q1 that upon receipt of the activation signal starts drawing current through the stationary stator windings 22 to create electro-magnetic fields that cause the magnets 18a-d on rotor 16 to start rotating around axle 24 (see FIGS. 1 and 10) in the first rotational direction. In these figures, it is at the most 90 degrees (in a four pole motor) before a new switching of the transistors must occur. In the preferred embodiment, the rotor 16 is disposed outside stator windings 22 (see FIGS. 1 and 10) that has four stator outwardly protruding segments or stator core or poles 22a-22d that protrude towards the rotor 16. It is also possible to have the stator windings located outside the rotor.

In. FIG. 10, the rotor 16 includes magnets 18a-d at different polarities (north and south-pole alternatingly) marked in black and white colors. Magnets 18a and 18c may have a "north pole" polarity while magnets 18b and 18d may have a "south pole" polarity. The electro-magnetic field that is created by the stator windings 22 causes the magnets on the rotor to rotate in a first direction such as in a clock-wise direction. The rotor 16 and magnets 18a-d are attached to or in operative engagement with the rotatable shaft 24 so when the rotor 16 rotates the shaft 24 also rotates.

A magnetic field sensor 43a is located outside the magnets 18a-d to sense the change of polarity of the magnets as they rotate around axle 24. The sensor 43a may be located between stator poles 22d and 22a. For example, sensor 43a may be located adjacent to the end of stator pole 24d. It is to be understood that sensor 43a may be located at other places outside the rotor 16 also. When sensor 43a senses each change of polarity point 45a-d on rotor 16 where the magnetic field polarity switches or changes from north pole to south pole and vice versa at the center of the magnetic sensor, then the sensor 43a sends a flank triggering signal, such as triggering signals 308a-d, to the CPU 36 so that CPU 36 receives the flank triggering signal before it is time to switch from one transistor to the next transistor to keep the rotation of rotor 16 going with the electromagnetic forces. The CPU 36 preferably uses the flank triggering signals received from sensor 43a to determine the rotational speed of rotor 16 because it knows the time difference between each triggering signal and the distance between the polarity changing-points 45a-d. The CPU can also use all sensors, such as sensors 43a and 43b, to get the higher resolution of the rotation (rpm signal).

FIG. 3 shows the current drawn by one transistor Q2 which magnetizes the stator in reverse against transistor Q1 when transistor Q2 is in the on-mode (north, south, north and south in coil 109). The other transistor Q1 would draw the current through the motor windings so that it magnetizes the stator reverse against transistor Q2 when transistor Q1 is in the on-mode (south north, south and north in coil 109). The transistor Q1 and Q2 are in this way alternatingly switched on and off to cause the rotor 16 to rotate in one direction. More particularly, CPU 36 uses the information in the triggering signals 308a-d received from sensor 43a, in addition to other information, to calculate when to switch on or off the transistors Q1 and Q2. The voltage is measured between R13 and R14 (see FIG. 9) as input into CPU 36. The current A may be measured by using R10 (see FIG. 9) at U5 as input into CPU 36. Upon receipt of a triggering signal from sensor 43a, the CPU can determine where rotor 16 is located in relation to the stator 22 since the location of sensor 43a is known to the CPU. As indicated earlier, the CPU 36 can determine the rotational speed ($\omega$) of rotor 16 and can calculate the time delay (t1) that should occur from, for example, the receipt of one of the triggering signals 308a-d from the sensor 43a (or 43b) until it is necessary to send the switching signal, such as PWM pulses 300-306, to the desired transistor, such as transistor Q1 or Q2. CPU 36 then calculates for each triggering signal received from the magnetic sensor when to send the switching or activation/inactivation signal 300 to the transistors to switch from one transistor to the next transistor i.e. to switch on transistor Q1 and to switch off transistor Q2 or switch on transistor Q2 and to switch off transistor Q1. As described below, it is also possible to keep both transistors Q1 and Q2 in an off-mode for a while to further improve the efficiency of the motor.

This switching of the transistors is controlled by the CPU that receives information from the magnetic sensor i.e. when the switch signals must be sent to the transistors to switch on or off the transistors to ensure that the rotation of rotor 16 continues. Upon receipt of the subsequent switch signal 302, the second transistor Q2 is turned on (after a time delay (t1) to start drawing current from stator 22 to continue the rotation of rotors 16. In this way, CPU 36 sends the switching signals in an 1,2 fashion to the first and second transistors, respectively. FIG. 11 describes a situation when the rotor rotates at a low rotational speed in which both transistors can be switched off for a time period (as explained in detail below) such as the time period between the termination of signal 300 and the activation of signal 302.

As indicated above, when the rotor rotates in the clock-wise direction, the sensor 43a, electrically connected to the CPU, senses a point of change of the magnetic polarity in the rotor when it passes the center of the sensor 43a, such as point 45a, and sends a flank triggering signal 308a to the CPU to alert the CPU that it is soon time to switch transistors. The time until the switch is actually done depends upon the rotational speed of the rotor and at which time delay (t1) the CPU has determined is optimal to switch to the next transistor. When the rotor of the motor rotates slowly (i.e. substantially below maximum rotational speed), the CPU can activate the transistors by sending short magnetizing on-pulses i.e. that can include high-frequency short PWM pulses 300-306 that are shorter than the time period between the triggering signals 308a-d. Such high-frequency short PWM pulses can be more effective, if they come in later into stator pole 22a-d relative to the rotating magnets 18a-18d so that the magnet has had time to rotate a bit longer relative to the stator. Longer on-pulses including high-frequency longer PWM pulses or longer on-pulses (the pulses may or may not include PWM) increases the rotational speed of the rotor 16. When the rotor operates at a maximum or full speed, it is important to fully magnetize the stator i.e. to optimally use the time that exists between the change of magnetic polarity (i.e. between receiving the triggering signals from the sensor) because the current is drawn through the stator as long as possible before it is time to switch to the next transistor in order to reach the maximum rotational speed.

The activation/switch-on signal or high-frequency PWM pulse 300 sent to the first transistor Q1 should be done sometime after receiving the triggering signal 308a from the magnetic sensor 43a. The time period (t1) is not predetermined because the CPU will find the most efficient length of the time period (t1) by testing time periods that are longer and shorter than the time period (t1) each time a triggering signal 308 is received by, for example, measuring the current required to drive the motor at a certain rotational speed or rpm. As explained below, preferably, the CPU selects the time period (t1) that requires the least current to drive the motor at a particular constant rotational speed.

FIG. 11 shows a schematic view of how PWM pulses or activation signals can be sent to the transistors Q1 and Q2.

When the motor is not operating at maximum rotational speed or rpm, it is possible for the CPU to delay sending the PWM on-pulses to the transistors Q1 and Q2 so that the PWM pulses that magnetizes the stator poles are sent when the rotor magnetic pole 45a-45d reached a bit into the stator poles 22a-22d. In this way, it is possible for the CPU to wait with the start of the magnetization until the optimal position on the stator is reached by the rotating magnets 18a-d on the rotor to start the magnetizing of the stator segment 22a-d. Upon receipt of a flank triggering signal 308a from magnet sensor 43a (as a result of sensing a change of magnetic polarity on the rotating rotor 16 that has four magnets 18a-18d), the CPU delays sending the PWM pulse or activation/switching signal 300 to transistor Q1 for the time period (t1). It should be understood since the time period (t1) is equivalent to the alpha1 ($\alpha$1) degrees in FIG. 10, the CPU iteratively optimizes the time period (t1) the same way as the optimization of alpha1 ($\alpha$1) degrees described below. The CPU sends the on-pulses 300 to transistor Q1 for a time period (I1) after this time period (I1) transistor Q1 turns off and there is a time period until a new trigger flank or triggering signal 308b from the magnetic sensor 43a is received by the CPU. During this time period after transistor Q1 is turned off but before signal 308b is received by the CPU, both transistors Q1 and Q2 are in the off-mode or turned off. The new trigger flank 308b starts a new time and after a time period (t1), the CPU sends an on-pulse 302 to activate transistor Q2 for a time period (I2) and after this time period (I2) transistor Q2 turns off and there is a certain time delay until a new trigger flank 308c is received by the CPU from the magnetic sensor 43a. This new trigger flank 308c starts a new time and after the time period (t1), the CPU sends an on-pulse 304 to activate transistor Q1 that is activated for a time period (I3) and after this time period (I3) transistor Q1 turns off and there is a delay until a new trigger flank 308d is received from the magnetic sensor 43a by the CPU. This new trigger flank 308d starts a new time and after a time period (t1) the CPU sends an on-signal 306 to activate transistor Q2 for a time period (I4) after this time period (I4) transistor Q2 turns off and there is a delay until a new trigger flank from the magnetic sensor is received by the CPU and then after time (t1) starts the process with transistor Q1 again. This description is for a four-pole motor so after these four steps process it starts again with transistor Q1 and so on.

The angle alpha1 ($\alpha$1) may range from 0 to 90 degrees in a four pole motor. This means the earliest the CPU could send the pulses to the transistors is at the same time, i.e. without delay, the CPU receives the triggering signal from one of the magnet sensors. The latest the CPU could send the pulses to the transistor is after 90 degrees from the position of the magnetic sensor i.e. right before or at the same time as the CPU receives the next triggering signal from the magnetic sensor. The corresponding maximum time (t1) could be calculated at 50 rpm as 3,333 ms per degree×90 degrees=300 ms. At 5000 rpm, the corresponding maximum time (t1) could be calculated as 33 microseconds per degree×90 degrees=3 ms. The time period (t1) may thus range from 3 milliseconds to 300 milliseconds for 5000 rpm to 50 rpm. More preferably, when alpha1 ($\alpha$1) is 30 degrees, the time period (t1) is at 100 milliseconds when the rpm is at 50 and the time period (t1) is at 1 millisecond when the rpm is at 5000.

The time periods (I1), (I2), (I3) and (I4) of the on-pulses may range from 1 milliseconds to 500 milliseconds. More preferably, the time period (I1), (I2), (I3) and (I4) are within 3 milliseconds and 500 milliseconds. The exact length of the time periods depends, among other things, on the rpm and motor load. If the motor is rotating at 100 revolutions per minute (rpm), it is 60 sec/100 laps=0.6 sec per revolution and divided by 360 degrees is 0.6 sec/360 degrees=1,666 ms per degree. At 2500 revolutions, the mS/degree may be calculated as 60 sec/2500 laps=24 ms per revolution/360 degrees=66.66 microseconds per degree. The above rotational speeds are examples of rotational speeds that the motor can rotate at. The motor may also run at rpms that are higher or lower which changes the time period (t1) in a corresponding way.

The principles of alpha2 ($\alpha$2) is exactly the same as for alpha1 ($\alpha$1) when the rotor rotates in the opposite direction. For clarity, only the rotation in one direction using alpha1 ($\alpha$1) has been described in detail. Upon receipt of the triggering flank signal 308a from sensor 43a, the CPU delays sending the on-pulse 300 to transistor Q1 for a time period (t1) and pulse 300 lasts for a time period (I1). Upon receipt of the triggering flank signal 308b, the CPU again delays sending the PWM on pulse 302 to transistor Q2 for a time period (t1). The length (I2) of the PWM on-pulse (with or without included PWM) and when the PWM on-pulse is sent determine the rotational speed $\omega$ or rpm of the rotor 16. After time period (t1), the CPU then sends the PWM on-pulse 302 to transistor Q2 for a time period (I2) before turning it off. It should be noted here that the length of PWM on-pulse 302 may be different than the length of PWM on-pulse 300 because the CPU may test different lengths (l) of the PWM on-pulse until the optimal and the most efficient length (l) of the PWM on-pulses has been found. Similarly, the time period (t1) may be changed to time period (t1') that is slightly different from time period (t1) until the CPU has found which delay of time period (t1) is the most efficient. For simplicity, time period (t1) is the same before each PWM on-pulse in FIG. 11. The CPU receives another triggering flank signal 308c from the magnetic sensor 43a and the CPU delays sending the PWM pulse 304 to transistor Q1 for a time period (t1). The length of the PWM on pulse 304 is a time period (I3) before it is turned off. Upon receipt of the next triggering flank signal 308d, the CPU again delays sending the PWM pulse 306 to transistor Q1 for a time period (t1). The PWM pulse 306 has a length of a time period (I4) before it is turned off by the CPU. The CPU then receives another triggering flank signal from sensor 43a. The rotor 16 has now rotated one revolution (see FIG. 10) and the same process starts again for the second revolution etc.

Assuming the rotor rotates at a constant ($\omega$) or rpm (but not at maximum rpm) and voltage V is constant, the CPU then determines the amount of current A1 that is required to rotate the rotors 16 and magnets 18a-18d at the rotational speed ($\omega$). The next time activation/switching signals are sent, the next transistor Q2 may be switched on while the first transistor Q1 may be switched off. The CPU may be programmed to send the next switching signals such as sometime after the signal from the magnetic sensor 43a or 43b switches to high or low. The principles of using alpha2' ($\alpha$2'), i.e. a degree that is slightly different from alpha1 ($\alpha$1), are exactly the same as for alpha1' ($\alpha$1') when the rotor rotates in the opposite direction. To use the terminology of FIG. 11, the CPU may change the time period (t1) to a slightly different time period (t1') to iteratively search for the time period that makes the operation of the motor the most efficient (such as by measuring and minimizing the current required to drive the motor at a particular rotational speed). The CPU then determines the amount of current A2 that is required to drive the rotor 16 and magnets 18a-18d at the constant rotational speed ($\omega$). The CPU compares current A1 with current A2 and selects the alpha degrees or time period of delay that generates the lowest current value of current A1 and current A2. The CPU continues this adaptive iteration until CPU 36 has found the lowest current $A_{min}$ that can drive the rotor at the rotation speed ($\omega$). In this way, CPU 36 optimizes the effectiveness of motor by selecting the time of the starting signal i.e. the optimal $alpha1_{opt}$ degrees that generates the lowest current $A_{min}$ needed. CPU 36 switches, in this way, between the transistors Q1, Q2 and the rate of the switching, i.e. the time between switching and the transistor switched on-time from one transistor to another transistor, determines the rotational speed ($\omega$) or rpm of rotor 16 and the order of using the transistors determines the rotational direction of rotor 16. For example, if the CPU first sends the switching or activation signal 300 to the first transistor Q1 and then signal 302 to transistor Q2, i.e. in a Q1, Q2, Q1, Q2 etc. fashion, the rotor rotates in a first or clockwise direction and if the CPU sends the switching or activation signal 300 first to transistor Q2 and then sends signal 302 to transistor Q1, i.e. in a Q2, Q1, Q2, Q1 etc. fashion, then the rotor rotates in a second opposite counter-clockwise direction. The combination of sensors 43a and 43b may be used by CPU 36 to determine the rotational speed ($\omega$) and the direction of rotation and to send information to the CPU about where the rotor is. This information is sent to the CPU before the transistors must be switched and this applies to both rotational directions.

The motor may be optimized to rotate in one rotational direction and the switching sequence between the transistors can be characterized as Q1-Q2-Q1-Q2-Q1-Q2-Q1-Q2 to rotate the rotor/motor in one rotational direction from the start of the motor. As indicated above, if the CPU sends the switching signal in the reverse order Q2-Q1-Q2-Q1-Q2-Q1-Q2-Q1 from the start of the motor and the sensors are located in the optimal position, the motor rotates in the opposite rotational direction. The amount of time the transistors are conducting current determines how much current that flows through the stator windings and thus the power of the motor. In other words, the more current the faster the rotor rotates and the more powerful the motor becomes. This may be controlled by varying the activation time i.e. the conducting time of the transistor and the length of the PWM on-pulses or the on pulses (see earlier segments about shortening and lengthening the PWM pulses). As described in detail above, the PWM pulses are preferably truncated to make the motor more quiet and the rotational speed may be controlled by varying the length of the PWM on-pulses (or activation/switching signals) that activates the transistors. The CPU thus optimizes the efficiency of the motor by varying the conducting time or the length (l1, l2, l3 and l4 in FIG. 11) of the on-signal such as the length of the PWM pulses or the length of the on-pulses sent to the transistors and by controlling the timing of the switching on signals sent to the transistors to lower the motor current (i.e. power consumption) while maintaining the rotational speed ($\omega$). The on-time of the transistor can include PWM short pulses wherein the on-time of the short PWM pulses can be varied to control the current. It can also be a constant on-signal that lasts a certain time period. As mentioned earlier, the PWM frequency is preferably very high, such as 16 kHz or higher, so that the human hear does not hear it. By using the CPU, it is possible to sometimes use PWM signals and sometimes only use on-pulses that are not PWM signals. It may be advantageous to combine the two types of signals. For example, high-frequency PWM signals may be preferred for low rotational speeds of the motor to make the motor more quiet while on-pulses (without PWM) may be used at high rotational speeds to improve the efficiency and minimize the losses since it is difficult to hear electric noise from the on-pulses when the motor rotates at a very high speed. An estimation of this point, i.e. when to switch off the PWM pulses and switch to the activation of transistors without the PWM pulses, can be around about 1500 rpm. It is Important not switch off the PWM too early so that the electric sound can be heard. Preferably, the fan noise should be higher than the electric noise before switching off the PWM.

As indicated above, it is possible to change to rotational direction from a clockwise to a counter-clockwise direction. Before the rotor switches rotational direction, the CPU 36 may gradually change or reduce the pulse width of the transistors so that the speed decreases and eventually comes to a stop. As mentioned above, the CPU 36 may send start signals or on-pulses to the transistor first in such a way as to slow down the rotation before the rotors have stopped rotating in the clockwise direction by gradually shortening the on-time of the PWM pulses. By keep on sending the start or switching signals to the second and first transistors in a Q2,Q1 fashion the rotors 16 and magnets 18a-18d are caused to start rotating in the counter-clockwise direction. The CPU can also combine different types of on-signals sent to the transistors. For example, on-signals consisting of PWM pulses or on-signals without PWM and also the combination of these two types depending on at which rpm of the motor is running.

It is also possible to integrate the above features into an integrated circuit. The CPU, power transistors, filter activation on/off could be included in the integrated circuit but probably not the magnetic sensors. The sensors can be connected to the integrated circuit, as inputs as well as the interface pins for connections to the stator windings and the capacitors.

While the present invention has been described in accordance with preferred compositions and embodiments, it is to be understood that certain substitutions and alterations may be made thereto without departing from the spirit and scope of the following claims.

I claim:

1. A method for making an electric motor more efficient, comprising:
providing an electric motor having a rotor being rotatable in a first direction relative to a stator winding, a first and a second transistor electrically connected to the stator winding and to a processor, the rotor having magnets of first and second polarities separated at polarity changing points;
a sensor sensing a first polarity changing point, the sensor sending a first triggering signal to the processor;
upon receipt of the first triggering signal, the processor delaying by a time period (t1) before sending a first activation signal to the first transistor to start rotating the rotor in the first direction, the first activation signal lasting for a time period (I1);
the processor measuring a current A1 driving the electric motor at a rotational speed;
the sensor sensing a second polarity changing point, the sensor sending a second triggering signal to the processor;
upon receipt of the second triggering signal, the processor delaying by a time period (t1') before sending a second activation signal to the second transistor to continue rotating the rotor in the first direction, the second activation signal lasting for a time period (I2);
the processor measuring a current A2 driving the electric motor at the rotational speed;

the processor comparing the current A1 to the current A2 and selecting time period (t1) for sending activation signals when the current A2 is greater than the current A1 and selecting time period (t1') for sending activation signals when the current A1 is greater than the current A2; and the processor iteratively changing the time period (t1) for each activation signal sent until a minimum current $A_{min}$ is found by comparing measured currents to optimize an efficiency of the electric motor.

2. The method according to claim 1 wherein the method further comprises using a first PWM pulse as the first activation signal.

3. The method according to claim 1 wherein the method further comprises varying a length of the first PWM pulse to the first transistor.

4. The method according to claim 1 wherein the method further comprises measuring the current A1 and the current A2 at a constant rotational speed ($\omega$) of the rotor.

5. The method according to claim 1 wherein the method further comprises the processor continuously monitoring currents driving the electric motor.

6. The method according to claim 1 wherein the method further comprises alternatingly using the first and second transistor to drive the rotor in the first rotational direction.

* * * * *